(12) United States Patent
Kim et al.

(10) Patent No.: US 12,112,674 B2
(45) Date of Patent: Oct. 8, 2024

(54) ELECTRONIC DEVICE INCLUDING EXTENDABLE DISPLAY FOR EXPANDING AND REDUCING DISPLAY AREA THAT IS VISIBLE FROM FRONT SIDE OF HOUSING AND CONTROL METHOD THEREFOR

(71) Applicant: Samsung Electronics Co., Ltd., Suwon-si (KR)

(72) Inventors: Juyeoung Kim, Suwon-si (KR); Sanghyuk Koh, Suwon-si (KR); Joseph Kim, Suwon-si (KR); Jun Kim, Suwon-si (KR); Hyeryoung Kim, Suwon-si (KR); Jaewoong Chung, Suwon-si (KR); Hanchul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/172,763

(22) Filed: Feb. 22, 2023

(65) Prior Publication Data

US 2023/0206808 A1    Jun. 29, 2023

Related U.S. Application Data

(63) Continuation of application No. PCT/KR2021/014239, filed on Oct. 14, 2021.

(30) Foreign Application Priority Data

Nov. 12, 2020    (KR) ........................ 10-2020-0150889

(51) Int. Cl.
*G09G 3/20*    (2006.01)
(52) U.S. Cl.
CPC ......... *G09G 3/20* (2013.01); *G09G 2330/021* (2013.01)

(58) Field of Classification Search
CPC .... G09G 3/20; G09G 2330/021; G09G 5/391; Y02D 10/00; G06F 1/16; G06F 1/3212; G06F 1/3234; G06F 1/1652
See application file for complete search history.

(56) References Cited

U.S. PATENT DOCUMENTS

| | | | |
|---|---|---|---|
| 2006/0101293 A1* | 5/2006 | Chandley | G06F 1/3203 |
| | | | 713/300 |
| 2008/0155466 A1 | 6/2008 | Lee | |

(Continued)

FOREIGN PATENT DOCUMENTS

| | | |
|---|---|---|
| CN | 108259658 A | 7/2018 |
| JP | 2006-261785 A | 9/2006 |

(Continued)

OTHER PUBLICATIONS

International Search Report and Written Opinion dated Jan. 14, 2022, issued in International Patent Application No. PCT/KR2021/014239.

*Primary Examiner* — David D Davis
(74) *Attorney, Agent, or Firm* — Jefferson IP Law, LLP

(57) ABSTRACT

A storage medium that stores commands, the commands being configured to enable at least one processor of an electronic device to perform at least one operation when executed by the at least one processor is provided. The at least one operation comprises identifying a remaining amount of a battery of the electronic device and a power consumption rate of the electronic device, and controlling, based on the remaining amount of battery and the power consumption rate, a driving circuit of the electronic device to switch a display of the electronic device from a first state to a second state, wherein a first area of the display is exposed in the first state, the first area including a second (Continued)

area and a third area and wherein the second area is exposed and the third area is not exposed in the second state.

15 Claims, 24 Drawing Sheets

(56) References Cited

U.S. PATENT DOCUMENTS

| | | |
|---|---|---|
| 2010/0048139 A1 | 2/2010 | Seo et al. |
| 2011/0143815 A1 | 6/2011 | Inami |
| 2011/0216064 A1 | 9/2011 | Dahl et al. |
| 2012/0038613 A1* | 2/2012 | Choi ........................ G09G 3/20 345/211 |
| 2014/0004906 A1 | 1/2014 | Chi et al. |
| 2014/0118271 A1 | 5/2014 | Lee et al. |
| 2014/0189583 A1 | 7/2014 | Yang |
| 2014/0218375 A1 | 8/2014 | Kim |
| 2015/0248144 A1* | 9/2015 | Hong .................... G06F 1/3265 361/679.27 |
| 2016/0306534 A1 | 10/2016 | Woo et al. |
| 2020/0076940 A1 | 3/2020 | Kim et al. |
| 2020/0221585 A1 | 7/2020 | Cho |

FOREIGN PATENT DOCUMENTS

| | | | |
|---|---|---|---|
| JP | 2008-028969 A | 2/2008 | |
| JP | 2016-506566 A | 3/2016 | |
| KR | 10-0455778 B1 | 11/2004 | |
| KR | 10-2007-0011690 A | 1/2007 | |
| KR | 10-2007-0068843 A | 7/2007 | |
| KR | 10-2008-0057940 A | 6/2008 | |
| KR | 10-2011-0058879 A | 6/2011 | |
| KR | 10-2011-0066891 A | 6/2011 | |
| KR | 10-2014-0003132 A | 1/2014 | |
| KR | 10-2014-0054746 A | 5/2014 | |
| KR | 10-2014-0100149 A | 8/2014 | |
| KR | 101441413 B1 * | 9/2014 | ........... G06F 1/3265 |
| KR | 10-2016-0123620 A | 10/2016 | |
| KR | 10-2017-0090295 A | 8/2017 | |
| KR | 10-2020-0084980 A | 7/2020 | |
| WO | 2014/105276 A1 | 7/2014 | |

* cited by examiner

ELECTRONIC DEVICE INCLUDING EXTENDABLE DISPLAY FOR EXPANDING AND REDUCING DISPLAY AREA THAT IS VISIBLE FROM FRONT SIDE OF HOUSING AND CONTROL METHOD THEREFOR

CROSS-REFERENCE TO RELATED APPLICATION(S)

This application is a continuation application, claiming priority under § 365(c), of an International Application No. PCT/KR2021/014239, filed on Oct. 14, 2021, which is based on and claims the benefit of a Korean patent application number 10-2020-0150889, filed on Nov. 12, 2020, in the Korean Intellectual Property Office, the disclosure of which is incorporated by reference herein in its entirety.

BACKGROUND

1. Field

The disclosure relates to an electronic device including an extendable display and a control method therefor.

2. Description of Related Art

Various services and additional functions provided through electronic devices, for example, portable electronic devices, such as smartphones, are gradually increasing. In order to effectively provide various services and additional functions, electronic devices including extendable displays are proliferating. An extendable display may refer to a display capable of expanding or reducing an area where a screen is displayed, such as a foldable display and a slidable display. In addition to the electronic device including a single display to be extended or reduced by folding or sliding, an electronic device that includes a plurality of displays and has a display area for displaying a screen to be increased or reduced by a change in the arrangement of the plurality of displays may be regarded as the extendable display.

The electronic device may be configured to allow a user to manually expand or contract a display or configured to expand or contract the display by controlling a driving circuit according to a user input. The electronic device may also be configured such that one of expansion and contraction of the display is manually performed and such that the remaining one thereof is performed by controlling a driving circuit according to a user input.

The above information is presented as background information only to assist with an understanding of the disclosure. No determination has been made, and no assertion is made, as to whether any of the above might be applicable as prior art with regard to the disclosure.

SUMMARY

In an electronic device including an extendable display, although a wide screen may be provided to the user when the display is extended, the battery consumption rate may increase due to an increase in the area for displaying a screen. The case where a plurality of application screens is provided on a multi-window using a wide screen and where a plurality of applications is executed in the foreground may increase the battery consumption rate, compared to the case where a single application is executed in the foreground. In addition, in the case where at least one of expansion or contraction of the display is performed by a driving circuit, power may be consumed to extend or reduce the display.

Aspects of the disclosure are to address at least the above-mentioned problems and/or disadvantages and to provide at least the advantages described below. Accordingly, an aspect of the disclosure is to provide an electronic device that adjusts at least one of the operation of a driving circuit or screen brightness of a display of the electronic device, based on a remaining amount of battery and a power consumption rate of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display, a driving circuit, a battery, and at least one processor, wherein the at least one processor may be configured to identify a remaining amount of the battery and a power consumption rate of the electronic device and control the driving circuit to switch the display from a first state to a second state, based on the remaining amount of battery and the power consumption rate, wherein a first area of the display is exposed in the first state, the first area including a second area and a third area and wherein the second area is exposed and the third area is not exposed in the second state.

In accordance with another aspect of the disclosure, a method performed by at least one processor of an electronic device is provided. The method includes identifying a remaining amount of battery of the electronic device and a power consumption rate of the electronic device and controlling the driving circuit to switch a display of the electronic device from a first state to a second state, based on the remaining amount of battery and the power consumption rate, wherein a first area of the display may be exposed in the first state, the first area including a second area and a third area and wherein the second area may be exposed and the third area may not be exposed in the second state.

In accordance with another aspect of the disclosure, a storage medium that stores commands, the commands being configured to enable at least one processor of an electronic device to perform at least one operation when executed by the at least one processor is provided. The at least one operation includes identifying a remaining amount of a battery of the electronic device and a power consumption rate of the electronic device, and controlling a driving circuit of the electronic device to switch a display of the electronic device from a first state to a second state, based on the remaining amount of battery and the power consumption rate, wherein a first area of the display is exposed in the first state, the first area including a second area and a third area and wherein the second area is exposed and the third area is not exposed in the second state.

In accordance with another aspect of the disclosure, an electronic device is provided. The electronic device includes a display, a driving circuit, a battery, and at least one processor, wherein the at least one processor may be configured to identify a remaining amount of the battery and a power consumption rate of the electronic device, identify an extension command to switch the display from a second state to a first state, control the driving circuit to switch the display from the second state to the first state, based on the remaining amount of battery and the power consumption rate, in response to the extension command, and control the display such that the screen brightness in the first state is less than the screen brightness in the second state, wherein a first area of the display is exposed in the first state, the first area including a second area and a third area and wherein the second area is exposed and the third area is not exposed in the second state.

According to an embodiment, an electronic device including an extendable display and a control method therefor are provided. An electronic device according to embodiments may control a driving circuit to reduce a display in an extended state, based on a remaining amount of battery and a power consumption rate of the electronic device, to reduce power consumed to display a screen when battery power needs to be saved.

An electronic device according to embodiments may reduce a display expansion or contraction rate, based on a remaining amount of battery and a power consumption rate of the electronic device, thereby reducing power consumption.

An electronic device according to embodiments may control the display such that the screen brightness of the display in an extended state is less than the screen brightness of the display in a contracted state, based on a remaining amount of battery and a power consumption rate of the electronic device, thereby reducing power consumed to display a screen when battery power needs to be saved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
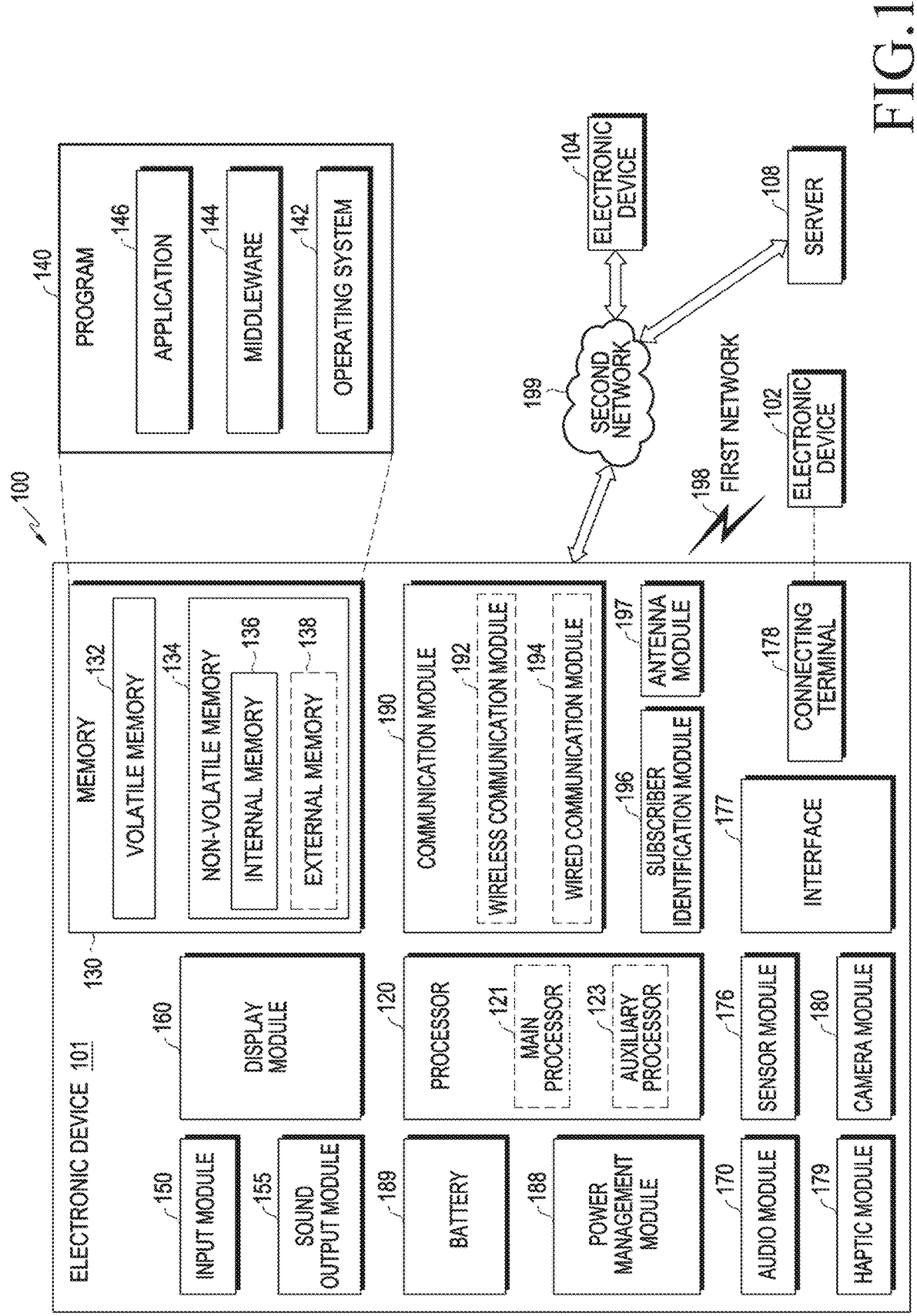
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a driving circuit 181, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The driving circuit 181 may operate a motor (not shown) based on a signal from the processor (e.g., the processor 120) included in the electronic device 101. Upon the operation of the motor, the state of a display of the electronic device 101 may be switched from an extended state to a reduced state, or may be switched from a reduced state to an extended state. The extended state and the reduced state of the display will be described below with reference to FIGS. 2A and 2B.

The power management module 188 may manage power supplied to the electronic device 101. According to one embodiment, the power management module 188 may be implemented as at least part of, for example, a power management integrated circuit (PMIC). According to an embodiment, part of power which can be provided by the battery 189 may be allocated as reserve power. According to an embodiment, the reserve power may be power, the use of which is reserved while an operating system is in operation. According to an embodiment, the residual amount of the battery 189 falls to the level equal to or lower than a predetermined level, the operation of the operating system may be stopped. After the operation of the operating system is stopped, the reserve power may be used to switch the state of the display from a second state to a first state, or to display, on the display, a visual indication encouraging charging of the electronic device 101. According to an embodiment, after the operation of the operating system is stopped, the reserve power may be used to display, on the display, a visual indication indicating that the state of the display is switched from the second state to the first state.

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
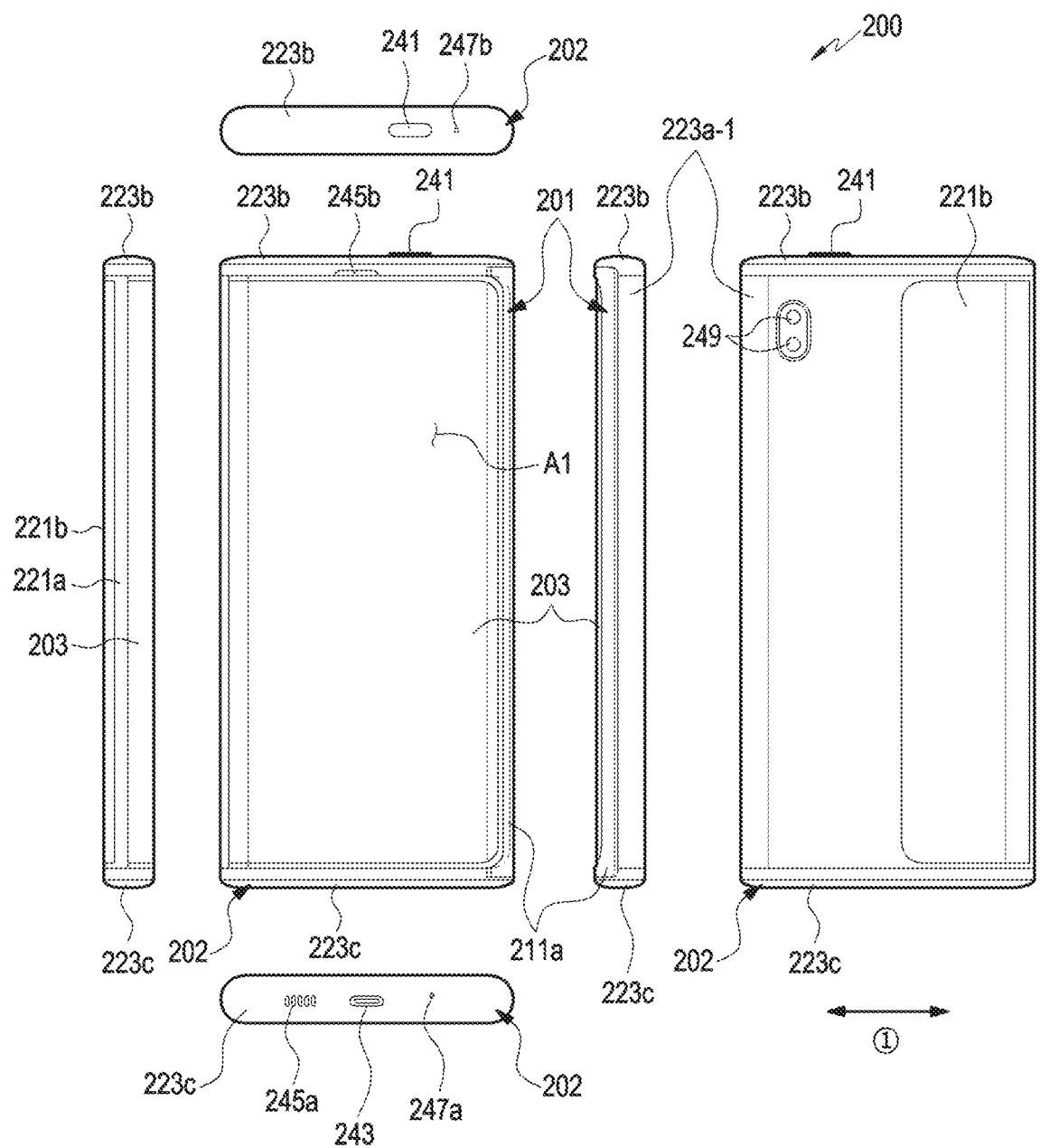
FIG. 2A illustrates an appearance of an electronic device with a display in a contracted state according to an embodiment of the disclosure.
Figure 2B:
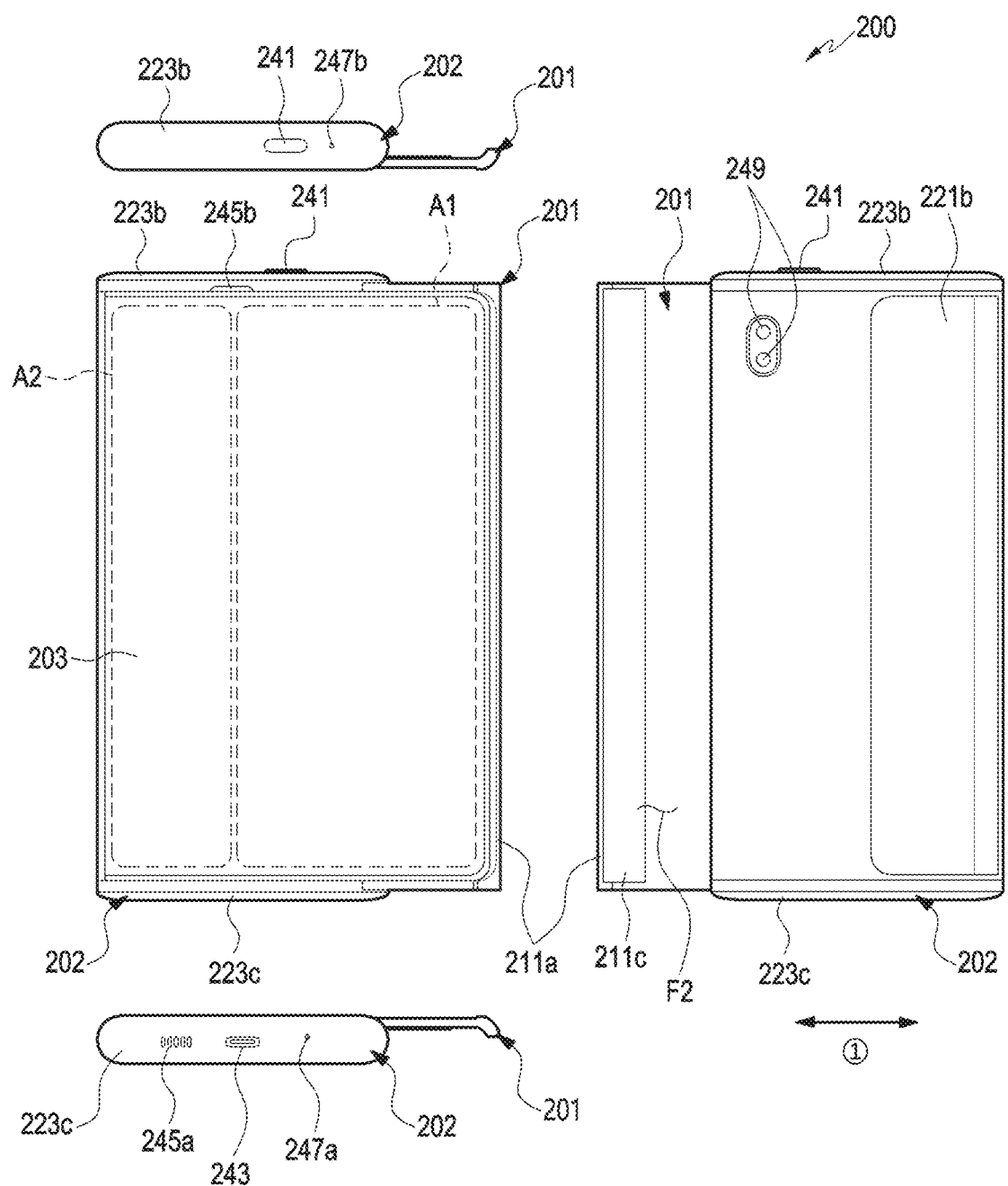
FIG. 2B illustrates an appearance of an electronic device with a display in an extended state according to an embodiment of the disclosure.

FIG. 2A illustrates an appearance of an electronic device 200 with a display in a contracted state according to an embodiment of the disclosure. FIG. 2B illustrates an appearance of an electronic device 200 with a display in an extended state according to an embodiment of the disclosure.

The state shown in FIG. 2A may be defined as the state in which a first structure 201 is closed with respect to a second structure 202, and the state shown in FIG. 2B may be defined as the state in which the first structure 201 is open with respect to the second structure 202. Depending on embodiments, a "closed state" or an "opened state" may be defined as the state in which an electronic device is closed or opened. When the electronic device 200 is in the closed state, a display 203 of the electronic device 200 may be in a contracted state. When the electronic device 200 is in the opened state, the display 203 of the electronic device 200 may be in an extended state.

Referring to FIGS. 2A and 2B, the electronic device 200 may include a first structure 201 and a second structure 202 movably disposed in the first structure 201. In some embodiments, it may be construed that the first structure 201 is disposed to slide on the second structure 202 in the electronic device 200. According to an embodiment, the first structure 201 may be disposed to reciprocate by a predetermined distance in the illustrated direction, for example, the direction denoted by an arrow ①, relative to the second structure 202.

According to various embodiments, the first structure 201 may be referred to as, for example, a first housing, a slide part, or a slide housing, and may be disposed to reciprocate on the second structure 202. In an embodiment, the second structure 202 may be referred to as, for example, a second housing, a main part, or a main housing, and may accommodate various electric and electronic components, such as a main circuit board or a battery. A portion (e.g., a first area A1) of a display 203 may be seated on the first structure 201. Another portion (e.g., a second area A2) of the display 203 may be received inside the second structure 202 (e.g., a slide-in operation) or exposed to the outside of the second structure 202 (e.g., a slide-out operation) as the first structure 201 moves (e.g., slides) relative to the second structure 202.

According to various embodiments, the first structure 201 may include a first plate 211a (e.g., a slide plate) and include a first face F1 (see FIG. 3) formed to include at least a portion of a first plate 211a and a second face F2 facing in the opposite direction of the first face F1. According to an embodiment, the second structure 202 may include a second plate 221a (see FIG. 3) (e.g., a rear case), a first side wall 223a extending from the second plate 221a, a second side wall 223b extending from the first side wall 223a and the second plate 221a, a third side wall 223c extending from the first side wall 223a and the second plate 221a and parallel to the second side wall 223b, and/or a rear plate 221b (e.g., a rear window). In some embodiments, the second side wall 223b and the third side wall 223c may be formed perpendicular to the first side wall 223a. According to an embodiment, the second plate 221a, the first side wall 223a, the second side wall 223b, and the third side wall 223c may be formed such that one side (e.g., a front face) thereof is open to receive (or enclose) at least a portion of the first structure 201. For example, the first structure 201 may be coupled to the second structure 202 so as to be at least partially enclosed thereby, thereby sliding in a direction parallel to the first face F1 or the second face F2, for example, in the arrow direction ①, while being guided by the second structure 202.

According to various embodiments, the second side wall 223b or the third side wall 223c may be omitted. According to an embodiment, the second plate 221a, the first side wall 223a, the second side wall 223b, and/or the third side wall 223c may be formed in separate structures and then coupled or assembled with each other. The rear plate 221b may be coupled to enclose at least a portion of the second plate 221a. In some embodiments, the rear plate 221b may be formed to be substantially integral with the second plate 221a. According to an embodiment, the second plate 221a or the rear plate 221b may cover at least a portion of the flexible display 203. For example, the flexible display 203 may be at least partially received inside the second structure 202, and the second plate 221a or the rear plate 221b may cover a portion of the flexible display 203 received inside the second structure 202.

According to various embodiments, the first structure 201 may move in a first direction (e.g., the direction ①) parallel to the second plate 221a (e.g., the rear case) and the second side wall 223b relative to the second structure 202 between an opened state and a closed state such that the first structure 201 is placed at a first distance from the first side wall 223a in the closed state and is placed at a second distance, which is greater than the first distance, from the first side wall 223a in the opened state. In some embodiments, the first structure 201 may be positioned to enclose a portion of the first side wall 223a in the closed state.

According to various embodiments, the electronic device 200 may include a display 203, a key input device 241, a connector hole 243, audio modules 245a, 245b, 247a, and 247b, or a camera module 249. Although not shown, the electronic device 200 may further include an indicator (e.g., an LED device) or various sensor modules.

According to various embodiments, the display 203 may include a first area A1 and a second area A2. In an embodiment, the first area A1 may be disposed on the first face F1 so as to extend substantially across at least a portion of the first face F1. The second area A2 may extend from the first area A1 and may be inserted or received inside the second structure 202 (e.g., a housing) or exposed to the outside of the second structure 202 according to the sliding movement of the first structure 201. As will be described later, the second area A2 may move while being substantially guided by a roller 251 (see FIG. 3) mounted to the second structure 202 so as to be received inside the second structure 202 or exposed to the outside thereof. For example, while the first structure 201 slides, a portion of the second area A2 may be deformed into a curved shape at a position corresponding to the roller 251.

According to various embodiments, if the first structure 201 moves from a closed state to an opened state, the second area A2 may be gradually exposed to the outside of the second structure 202 to form substantially a plane together with the first area A1 when viewed from above of the first plate 211a (e.g., a slide plate). The display 203 may be connected to at least one of a touch detection circuit, a pressure sensor capable of measuring the intensity (pressure) of a touch, and/or a digitizer detecting a magnetic-field type stylus pen or may be disposed adjacent thereto. In an embodiment, the second area A2 may be at least partially received inside the second structure 202, and a portion of the second area A2 may be exposed to the outside even in the state (e.g., the closed state) shown in FIG. 2A. In some embodiments, a portion of the exposed second area A2 may be position on the roller 251, irrespective of the closed state or opened state, so that a portion of the second area A2 may maintain a curved shape at a position corresponding to the roller 251.

The key input device 241 may be disposed on the second side wall 223b or the third side wall 223c of the second structure 202. The electronic device 200 may be designed such that the illustrated key input device 241 is excluded or additional key input devices are further included depending on the appearance and the usage state thereof. In some embodiments, the electronic device 200 may include a key input device that is not shown, for example, a home key button or a touch pad disposed around the home key button. According to another embodiment, at least a part of the key input device 241 may be located in one area of the first structure 201.

According to various embodiments, the connector hole 243 may be omitted depending on the embodiment and receive a connector (e.g., a USB connector) for transmitting and receiving power and/or data to and from an external electronic device. Although not shown, the electronic device 200 may include a plurality of connector holes 243, and some of the plurality of connector holes 243 may function as connector holes for transmitting and receiving audio signals to and from an external electronic device. Although the connector hole 243 is illustrated as being disposed on the third side wall 223c, the disclosure is not limited thereto, and the connector hole 243 or a connector hole may be disposed on the first side wall 223a or the second side wall 223b.

According to various embodiments, the audio modules 245a, 245b, 247a, and 247b may include speaker holes 245a and 245b and microphone holes 247a and 247b. One of the speaker holes 245a and 245b may be provided as a receiver hole for a voice call, and the other one may be provided as an external speaker hole. A microphone for obtaining an external sound may be disposed inside the microphone holes 247a and 247b, and a plurality of microphones may be disposed to detect the direction of sound in some embodiments. In some embodiments, the speaker holes 245a and 245b and the microphone holes 247a and 247b may be implemented as a single hole, or a speaker (e.g., a piezo speaker) may be provided without the speaker holes 245a and 245b. According to an embodiment, the speaker hole denoted by reference numeral "245b" may be disposed in the first structure 201 so as to be used as a receiver hole for a voice call, and the speaker hole (e.g., an external speaker hole) denoted by reference numeral "245a" or the microphone holes 247a and 247b may be disposed in the second structure 202 (e.g., one of the side faces 223a, 123b, and 123c).

The camera module 249 may be provided in the second structure 202 and may photograph a subject in the opposite direction of the first area A1 of the display 203. The electronic device 200 may include a plurality of camera modules 249. For example, the electronic device 200 may include a wide-angle camera, a telephoto camera, or a close-up camera, and according to an embodiment, the electronic device 200 may include an infrared projector and/or an infrared receiver to measure the distance to the subject. The camera module 249 may include one or more lenses, an image sensor, and an image signal processor. Although not shown, the electronic device 200 may further include a camera module (e.g., a front camera) for photographing a subject in the opposite direction of the first area A1 of the display 203. For example, the front camera may be disposed around the first area (A1) or in an area overlapping the display 203 and may photograph a subject by passing through the display 203 in the case where it is disposed in the area overlapping the display 203.

According to various embodiments, an indicator (not shown) of the electronic device 200 may be disposed in the first structure 201 or the second structure 202 and include a light-emitting diode to provide state information of the electronic device 200 using a visual signal. A sensor module (not shown) of the electronic device 200 may produce an electrical signal or data value corresponding to an internal operation state of the electronic device 200 or an external environmental state. The sensor module may include, for example, a proximity sensor, a fingerprint sensor, or a biometric sensor (e.g., an iris/face recognition sensor or an HRM sensor). In another embodiment, the sensor module may further include at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, and an illuminance sensor.

Although the slidable electronic device 200 that may have a closed state or an opened state has been described in FIGS. 2A and 2B, electronic devices according to various embodiments are not limited to the examples shown in FIGS. 2A and 2B. Other examples of an electronic device according to various embodiments will be described later with reference to FIGS. 4A, 4B, and 4C.

Figure 3:
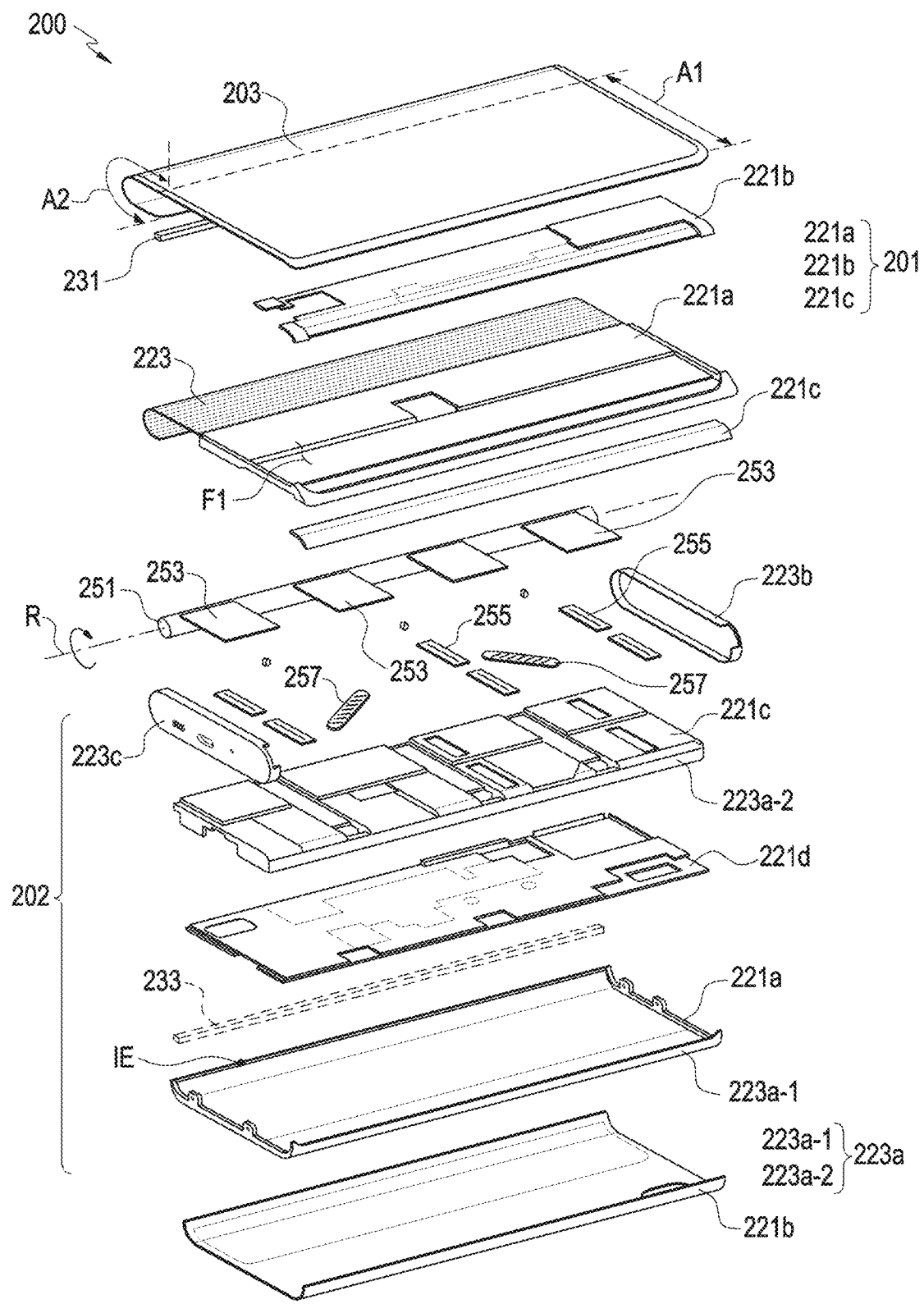
FIG. 3 illustrates a structure of an electronic device including an extendable display according to an embodiment of the disclosure.

FIG. 3 illustrates a structure of an electronic device including an extendable display according to an embodiment of the disclosure.

Referring to FIG. 3, an electronic device 200 may include a first structure 201, a second structure 202 (e.g., a housing), a display 203 (e.g., a flexible display), a guide member (e.g., a roller 251), a support sheet 253, and/or a multi joint hinge structure 213. A portion (e.g., a second area A2) of the display 203 may be received inside the second structure 202 while being guided by the roller 251.

According to various embodiments, the first structure 201 may include a first plate 211a (e.g., a slide plate), a first bracket 211b mounted to the first plate 211a, and/or a second bracket 211c. The first structure 201, for example, the first plate 211a, the first bracket 211b, and/or the second bracket 211c, may be formed of a metal material or a non-metal material (e.g., polymer). The first plate 211a may be mounted to the second structure 202 (e.g., the housing) and may reciprocate linearly in one direction (e.g., the arrow direction ① in FIG. 2A) while being guided by the second structure 202. In an embodiment, the first bracket 211b may be coupled to the first plate 211a to form a first face F1 of the first structure 201 together with the first plate 211a. A first area A1 of the display 203 may be substantially mounted on the first face F1 so as to remain flat. The second bracket 211c may be coupled to the first plate 211a to form a second face F2 of the first structure 201 together with the first plate 211a. According to an embodiment, the first bracket 211b and/or the second bracket 211c may be integrally formed with the first plate 211a. These may be appropriately designed based on the assembly structure of a product to be manufactured or the production process thereof. The first structure 201 or the first plate 211a may be coupled to the second structure 202 to slide relative to the second structure 202.

According to various embodiments, the multi joint hinge structure 213 may include a plurality of bars or rods 214 and may be connected to one end of the first structure 201. For example, as the first structure 201 slides, the multi joint hinge structure 213 may move relative to the second structure 202 to be substantially received inside the second structure 202 in a closed state (e.g., the state shown in FIG. 2A). In some embodiments, even in the closed state, a part of the multi joint hinge structure 213 may not be received inside the second structure 202. For example, even in the closed state, a part of the multi joint hinge structure 213 may be positioned outside the second structure 202 so as to correspond to the roller 251. The plurality of rods 214 may extend in a straight line to be disposed parallel to a rotation axis R of the roller 251, and may be arranged along a direction perpendicular to the rotation axis R, for example, a direction in which the first structure 201 slides.

According to various embodiments, the plurality of rods 214 may rotate around other rods 214 adjacent thereto while remaining parallel to the other adjacent rods 214. Accordingly, as the first structure 201 slides, the plurality of rods 214 may be arranged to form a curved surface or may be arranged to form a flat surface. For example, as the first structure 201 slides, the multi joint hinge structure 213 may form a curved surface at a portion facing the roller 251 and form a flat surface at a portion not facing the roller 251. In an embodiment, the second area A2 of the display 203 may be mounted or supported on the multi joint hinge structure 213 and exposed to the outside of the second structure 202 together with the first area A1 in the opened state (e.g., the state shown in FIG. 2B). In the state in which the second area A2 is exposed to the outside of the second structure 202, the multi joint hinge structure 213 may form substantially a flat surface, thereby supporting or maintaining the second area A2 in a flat state.

According to various embodiments, the second structure 202 (e.g., a housing) may include a second plate 221a (e.g., a rear case), a printed circuit board (not shown), a rear plate 221b, and a third plate 221c (e.g., a front case), and a support member 221d. The second plate 221a may be disposed in the opposite direction of the first face F1 of the first plate 211a and may substantially form the second structure 202 or the appearance of the electronic device 200. In an embodiment, the second structure 202 may include a first side wall 223a extending from the second plate 221a, a second side wall 223b extending from the second plate 221a to be substantially perpendicular to the first side wall 223a, and a third side wall 223c extending from the second plate 221a to be substantially perpendicular to the first side wall 223a and parallel to the second side wall 223b. In the illustrated embodiment, although the second side wall 223b and the third side wall 223c may be manufactured as separate components and mounted or assembled to the second plate 221a, they may be integrally formed with the second plate 221a. The second structure 202 may accommodate an antenna for proximity wireless communication, an antenna for wireless charging, or an antenna for magnetic secure transmission (MST) in a space that does not overlap the multi joint hinge structure 213.

According to various embodiments, the rear plate 221b may be coupled to the outer surface of the second plate 221a or may be formed integrally with the second plate 221a according to an embodiment. In an embodiment, the second plate 221a may be formed of a metal or polymer material, and the rear plate 221b may be formed of a material, such as metal, glass, synthetic resin, or ceramic, thereby providing a decorative effect for the exterior of the electronic device 200. According to an embodiment, the second plate 221a and/or the rear plate 221b may be formed of a material that at least partially (e.g., an auxiliary display area) transmits light. For example, in the state in which a portion (e.g., the second area A2) of the display 203 is received inside the second structure 202, the electronic device 200 may output visual information using a partial area of the display 203 received inside the second structure 202. The auxiliary display area may provide the visual information output from the area received inside the second structure 202 to the outside of the second structure 202.

According to various embodiments, the third plate 221c may be formed of a metal or polymer material and coupled to the second plate 221a (e.g., a rear case), the first side wall 223a, the second side wall 223b, and the third side wall 223c to form an inner space of the second structure 202. According to an embodiment, the third plate 221c may be referred to as a "front case", and the first structure 201, for example, the first plate 211a, may slide while substantially facing the third plate 221c. In some embodiments, the first side wall 223a may be configured as a combination of a first side wall portion 223a-1 extending from the second plate 221a and a second side wall portion 223a-2 formed on one edge of the third plate 221c. In another embodiment, the first side wall portion 223a-1 may be coupled to surround one edge of the third plate 221c, for example, the second side wall portion 223a-2, and in this case, the first side wall portion 223a-1 itself may form the first side wall 223a.

According to various embodiments, the support member 221d may be disposed in the space between the second plate 221a and the third plate 221c, and have a planar shape formed of a metal or polymer material. The support member 221d may provide an electromagnetic shielding structure in the inner space of the second structure 202 or improve the mechanical rigidity of the second structure 202. In an embodiment, the multi joint hinge structure 213 and a partial area (e.g., the second area A2) of the display 203, when received inside the second structure 202, may be positioned in the space between the second plate 221a and the support member 221d.

According to various embodiments, a printed circuit board that is not shown may be disposed in the space between the third plate 221c and the support member 221d. For example, the printed circuit board may be accommodated in a space inside the second structure 202, which is separated by the support member 221d from the space in which the multi joint hinge structure 213 and/or a partial area of the display 203 is received. A processor, a memory, and an interface may be mounted on the printed circuit board. The processor may include, for example, one or more of a central processing unit, an application processor, a graphic processing unit, an image signal processor, a sensor hub processor, or a communication processor.

The memory may include, for example, volatile memory or non-volatile memory.

The interface may include, for example, a high-definition multimedia interface (HDMI), a universal serial bus (USB) interface, an SD card interface, and an audio interface. For example, the interface may electrically or physically connect the electronic device 200 to an external electronic device and include a USB connector, an SD card/MMC connector, or an audio connector.

According to various embodiments, the display 203 may be a flexible display based on an organic light-emitting diode and may be at least partially deformed into a curved shape while maintaining a generally planar shape. In an embodiment, the first area A1 of the display 203 may be mounted or attached to the first face F1 of the first structure 201 to have a substantially flat shape. The second area A2 may extend from the first area A1 to be supported or attached to the multi joint hinge structure 213. For example, the second area A2 may extend along the sliding movement direction of the first structure 201 and may be received inside the second structure 202 together with the multi joint hinge structure 213 so as to be at least partially deformed to a curved shape according to the deformation of the multi joint hinge structure 213.

According to various embodiments, as the first structure 201 slides on the second structure 202, the area of the display 203 exposed to the outside may vary. The electronic device 200 (or the processor) may change the region of the display 203 to be activated based on the area of the display 203 exposed to the outside. For example, in an opened state or in an intermediate state between a closed state and an opened state, the electronic device 200 may activate the region of the second structure 202 exposed to the outside among the total area of the display 203. In the closed state, the electronic device 200 may activate the first area A1 of the display 203 and deactivate the second area A2. In the closed state, if there is no user input for a predetermined time (e.g., 30 seconds or 2 minutes), the electronic device 200 may deactivate the entire area of the display 203. In some embodiments, in the state in which the entire area of the display 203 is inactive, the electronic device 200 may activate a partial area of the display 203 as necessary (e.g., a notification according to a user setting or a missed call/message arrival notification), thereby providing visual information through an auxiliary display area (e.g., a portion of the second plate 221a and/or rear plate 221b made of a material that transmits light).

According to various embodiments, in the opened state (e.g., the state shown in FIG. 2B), substantially the entire area (e.g., the first area A1 and the second area A2) of the display 203 may be exposed to the outside, and the first area A1 and the second area A2 may be disposed to form a plane. In an embodiment, even in the opened state, a portion (e.g., one end) of the second area A2 may be positioned to correspond to the roller 251, and the portion of the second area A2 corresponding to the roller 251 may remain in a curved shape. For example, in various embodiments disclosed in this document, even though it is stated that "the second area A2 is disposed to form a plane in the opened state", a portion of the second area A2 may remain in a curved shape, and similarly, even though it is stated that "the multi joint hinge structure 213 and/or the second area A2 is received inside the second structure 202 in the closed state", a portion of the multi joint hinge structure 213 and/or second area A2 may be located outside the second structure 202.

According to various embodiments, a guide member, for example, the roller 251, may be rotatably mounted to the second structure 202 at a position adjacent to one edge of the second structure 202 (e.g., the second plate 221a). For example, the roller 251 may be disposed adjacent to the edge (e.g., the portion denoted by "IE") of the second plate 221a parallel to the first side wall 223a. Although reference numerals are not assigned in the drawing, another side wall may extend from the edge of the second plate 221a adjacent to the roller 251, and the side wall adjacent to the roller 251 may be substantially parallel to the side wall 223a. As described above, the side wall of the second structure 202 adjacent to the roller 251 may be formed of a material that transmits light, and a portion of the second area A2 may provide visual information by passing through the portion of the second structure 202 while being received inside the second structure 202.

According to various embodiments, one end of the roller 251 may be rotatably coupled to the second side wall 223b and the opposite end thereof may be rotatably coupled to the third side wall 223c. For example, the roller 251 may be mounted to the second structure 202 so as to rotate about the rotation axis R perpendicular to the sliding movement direction of the first structure 201 (e.g., the arrow direction ① in FIG. 2A or 2B). The rotation axis R may be disposed to be substantially parallel to the first side wall 223a and may be positioned on one edge of the second plate 221a so as to be spaced apart from the first side wall 223a. In an embodiment, the gap between the outer circumferential surface of the roller 251 and the inner surface of the edge of the second plate 221a may form an entrance through which the multi joint hinge structure 213 or the display 203 enter the second structure 202.

According to various embodiments, when the display 203 is deformed into a curved shape, the roller 251 may maintain the curvature radius of the display 203 to a certain degree, thereby suppressing excessive deformation of the display 203. The "excessive deformation" may indicate that the display 203 is deformed to have a small radius of curvature enough to damage pixels or signal wires included in the display 203. For example, the display 203 may be moved or deformed while being guided by the roller 251 and may be protected from damage due to the excessive deformation. In some embodiments, the roller 251 may rotate while the multi joint hinge structure 213 or the display 203 is inserted into the second structure 202 or drawn out therefrom. For example, the roller 251 may suppress friction between the multi joint hinge structure 213 (or the display 203) and the second structure 202, thereby facilitating the multi-joint hinge structure 213 (or the display 203) to be inserted into the second structure 202 or drawn out therefrom.

According to various embodiments, the support sheet 253 may be formed of a material having flexibility and a certain degree of elasticity, for example, an elastic material, such as silicone or rubber, and may be mounted or attached to the roller 251 so as to be selectively wound around the roller 251 according to the rotation of the roller 251. In the illustrated embodiment, a plurality of (e.g., four) support sheets 253 may be arranged along the direction of the rotation axis R of the roller 251. For example, the plurality of support sheets 253 may be mounted to the roller 251 at predetermined intervals from other support sheets 253 adjacent thereto and may extend in a direction perpendicular to the rotation axis R. In another embodiment, one support sheet may be mounted or attached to the roller 251. For example, the one support sheet may have a size and a shape corresponding to the areas where the support sheets 253 are disposed and the areas between the plurality of support sheets 253 in FIG. 3. As described above, the number, sizes, or shapes of the support sheets 253 may appropriately vary depending on an actually manufactured product. In some embodiments, the support sheet 253 may be rolled around the outer circumferential surface of the roller 251 or unrolled from the roller 251 to a flat shape between the display 203 and the third plate 221c according to the rotation of the roller 251. In another embodiment, the support sheet 253 may be referred to as a "support belt", an "auxiliary belt", a "support film", or an "auxiliary film".

According to various embodiments, an end of the support sheet 253 may be connected to the first structure 201, for example, the first plate 211a (e.g., a slide plate), and may be wound around the roller 251 in the closed state (e.g., the state shown in FIG. 2A). Accordingly, as the first plate 211a moves to switch to the opened state (e.g., the state shown in FIG. 2B), the support sheet 253 may be gradually positioned between the second structure 202 (e.g., the third plate 221c) and the display 203 (e.g., the second area A2) or between the second structure 202 (e.g., the third plate 221c) and the multi joint hinge structure 213. For example, at least a portion of the support sheet 253 may be positioned to face the multi joint hinge structure 213 and selectively wound around the roller 251 according to the sliding movement of the first plate 211a. The support sheet 253 may be generally disposed in contact with the multi joint hinge structure 213, but the portion thereof wound around the roller 251 may be substantially separated from the multi joint hinge structure 213.

According to various embodiments, the distance between the surface of the display 203 and the inner surface of the edge of the second plate 221a may vary depending on the degree to which the support sheet 253 is wound around the roller 251. As the disposed distance G is reduced, foreign substances may be prevented from entering therethrough, but if the distance is too small, the display 203 may come into contact with or rub against the second plate 221a. If they come into contact with or rub against each other, the surface of the display 203 may be damaged or the sliding operation of the first structure 201 may be hindered.

According to various embodiments, as the support sheet 253 is wound around the roller 251 in the closed state, the distance between the surface of the display 203 and the inner surface of the edge of the second plate 221a may be reduced while the surface of the display 203 is not in contact with the second plate 221a. For example, foreign substances may be prevented from flowing into the second structure 202 by reducing the disposed distance G in the closed state. In an embodiment, as the first structure 201 (e.g., the first plate 211a or the slide plate) moves to switch to the opened state, the support sheet 253 may gradually move from the roller 251 to the space between the second structure 202 (e.g., the second plate 221a or the third plate 221c) and the multi joint hinge structure 213. For example, as the first structure 201 moves to switch to the opened state, the disposed distance G may gradually increase, thereby suppressing direct friction or contact between the display 203 and other structures (e.g., the second plate 221a) and preventing the surface of the display 203 from being damaged according thereto. In some embodiments, the support sheet 253 may gradually increase in thickness thereof from one end (e.g., the portion fixed to the roller 251) to the other end (e.g., the portion fixed to the first plate 211a). Using the thickness profile of the support sheet 253, the disposed distance G may be adjusted in the closed state and the opened state.

According to various embodiments, the electronic device 200 may include one or more elastic members 231 and 233 made of a low-density elastic body, such as sponge, or brush. For example, the electronic device 200 may include a first elastic member 231 mounted to one end of the display 203 and further include a second elastic member 233 mounted to the inner surface of the edge of the second plate 221a according to an embodiment. The first elastic member 231 may be substantially disposed in the inner space of the second structure 202 and positioned to correspond to the edge of the second plate 221a in the opened state (e.g., the state shown in FIG. 2B). In an embodiment, the first elastic member 231 may move in the inner space of the second structure 202 according to the sliding movement of the first structure 201. When the first structure 201 moves to switch from the closed state to the opened state, the first elastic member 231 may move toward the edge of the second plate 221a. When the first structure 201 reaches the opened state, the first elastic member 231 may come into contact with the inner surface of the edge of the second plate 221a. For example, in the opened state, the first elastic member 231 may seal the gap between the inner surface of the edge of the second plate 221a and the surface of the display 203. In another embodiment, when moving from the closed state to the opened state, the first elastic member 231 may move (e.g., slidable contact) while being in contact with the second plate 221a. For example, if a foreign substance is introduced into the gap between the second area A2 and the second plate 221a in the closed state, the first elastic member 231 may discharge the foreign substance to the outside of the second structure 202 when moving to switch to the opened state.

According to various embodiments, the second elastic member 233 may be attached to the inner surface of the edge of the second plate 221a and disposed to substantially face the inner surface of the display 203. In the closed state, the distance (e.g., the disposed distance) between the surface of the display 203 and the inner surface of the edge of the second plate 221a may be substantially determined by the second elastic member 233. According to an embodiment, in the closed state, the second elastic member 233 may come into contact with the surface of the display 203, thereby substantially sealing the disposed distance G. According to an embodiment, the second elastic member 233 may be formed of a low-density elastic body, such as sponge, or brush, it may not damage the surface of the display 203 even in direct contact with the display 203. In another embodiment, as the first structure 201 gradually moves to switch to the opened state, the disposed distance G may be increased. For example, the second area A2 may be gradually exposed to the outside of the second structure 202 while the display 203 does not substantially come into contact with or rub against the second elastic member 233. When the first structure 201 reaches the opened state, the first elastic member 231 may come into contact with the second elastic member 233. For example, in the opened state, the first elastic member 231 and the second elastic member 233 may seal the disposed distance G, thereby blocking inflow of foreign substances.

According to various embodiments, the electronic device 200 may further include the guide rail(s) 255 and/or the actuating member(s) 257. The guide rail(s) 255 may be mounted to the second structure 202, for example, the third plate 221c, to guide the sliding movement of the first structure 201 (e.g., the first plate 211a or the slide plate). The actuating member(s) 257 may include a spring or a spring module that provides an elastic force in a direction in which both ends thereof go far away from each other. One end of the actuating member(s) 257 may be rotatably supported by the second structure 202, and the opposite end thereof may be rotatably supported by the first structure 201. When the first structure 201 slides, both ends of the actuating member(s) 257 may be located closest to each other at one point (hereinafter a "closest point") between the closed state and the opened state. For example, in a section between the closest point and the closed state, the actuating member(s) 257 may provide an elastic force to the first structure 201 in a direction of moving toward the closed state, and in a section between the closest point and the opened state, the actuating member(s) 257 may provide an elastic force to the first structure 201 in a direction of moving toward the opened state.

In the following detailed description, the configurations capable of being easily understood through the preceding embodiments may be given the same reference numerals or the reference numerals may be omitted in the drawings, and detailed descriptions thereof may also be omitted. An electronic device (e.g., the electronic device 200 in FIGS. 2A to 3) according to various embodiments disclosed in this document may be implemented by selectively combining configurations of different embodiments, and configurations of one embodiment may be replaced by configurations of another embodiment. For example, it should be noted that the disclosure is not limited to specific drawings or embodiments.

Figure 4A:
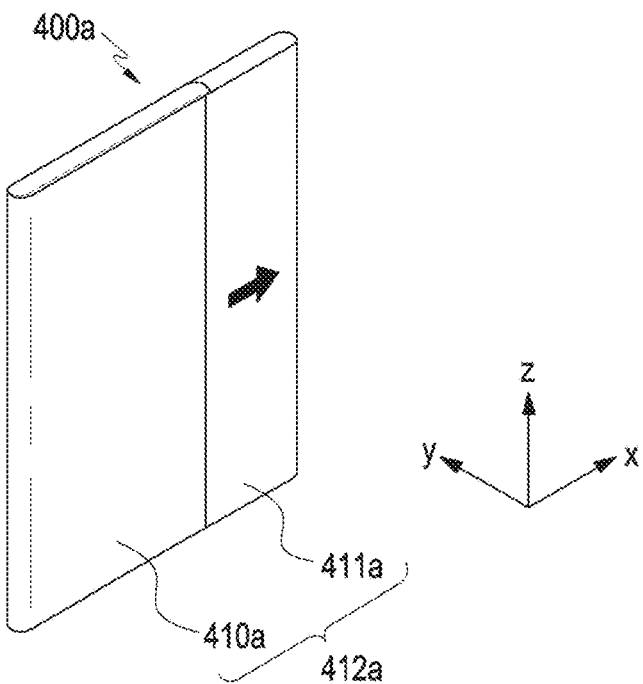
FIGS. 4A, 4B, and 4C illustrate an electronic device including an extendable display according to various embodiments of the disclosure.
Figure 4B:
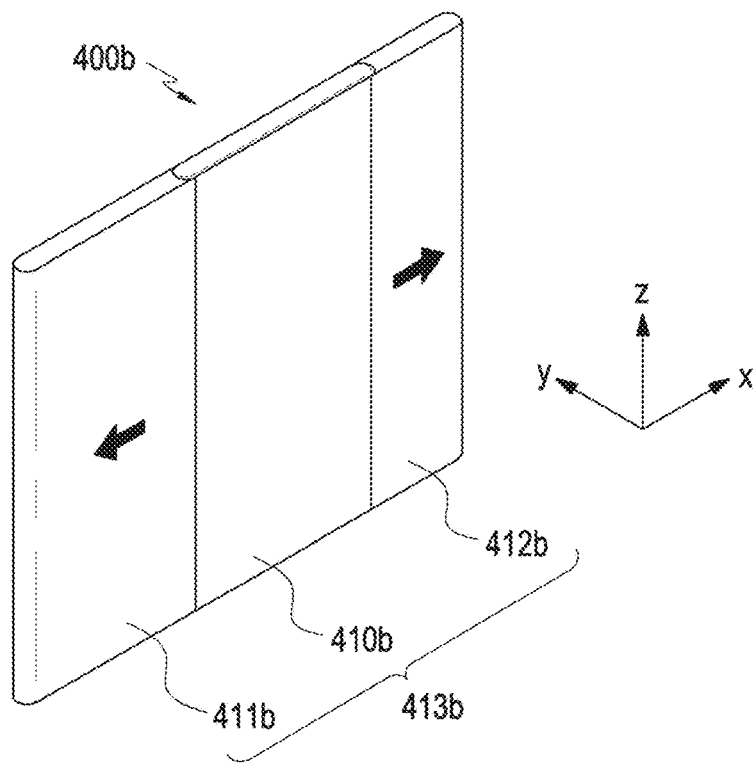
Figure 4C:
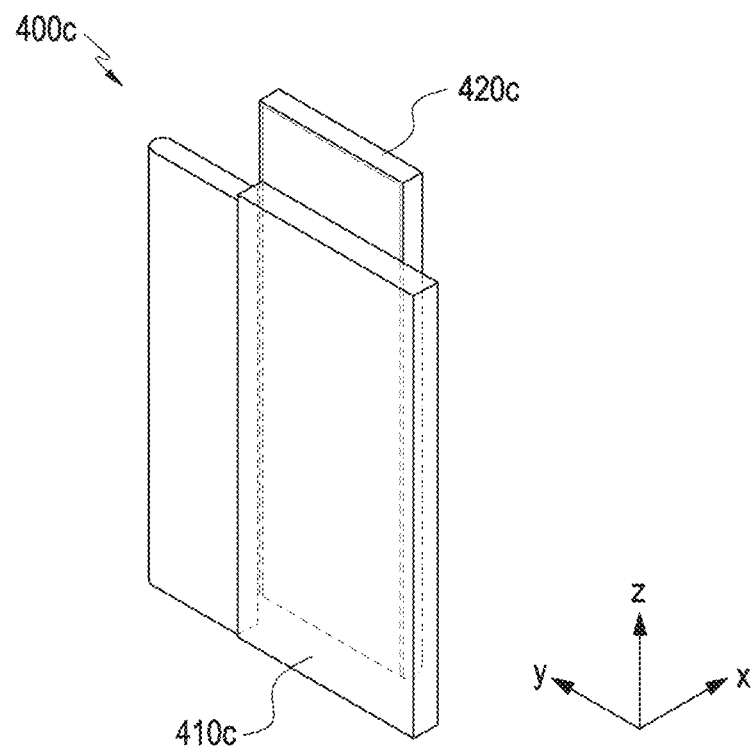

FIGS. 4A, 4B, and 4C illustrate an electronic device including an extendable display according to various embodiments of the disclosure.

Referring to FIG. 4A, when a display of an electronic device 400a in FIG. 4A is in a contracted state, only a first portion 410a of the display 412a may be exposed, and a second portion 411a of the display 412a may not be exposed. After the electronic device 400a in FIG. 4A is extended in the +x direction, the first portion 410a and the second portion 411a of the display 412a may be exposed.

Referring to FIG. 4B, when a display of an electronic device 400b in FIG. 4B is in a contracted state, only a first portion 410b of the display 413b may be exposed, and a second portion 411b and a third portion 412b of the display 413b may not be exposed. According to various embodiments, the electronic device 400b in FIG. 4B may be extended in the +x direction from one side of the first portion 410b. After the electronic device 400b in FIG. 4B is extended in the x direction, the first portion 410b and the third portion 412b of the display 413b may be exposed. According to various embodiments, the electronic device 400b in FIG. 4B may be extended in the −x direction from the other side of the first portion 410b. After the electronic device 400b in FIG. 4B is extended in the −x direction, the first portion 410b and the second portion 411b of the display 413b may be exposed.

According to various embodiments, unlike the display of the electronic device 400a in FIG. 4A is able to be extended at only one side of the first portion 410a of the display 412a exposed when it is in the contracted state, the display of the electronic device 400b in FIG. 4B may be extended at two sides of the first portion 210 of the display 413b exposed when it is in the contracted state. According to various embodiments, the state in which the first portion 410b and the second portion 411b of the display 413b are exposed and in which the third portion 412b thereof is not exposed and the state in which the first portion 410b and the third portion 412b of the display 413b are exposed and in which the second portion 411b thereof is not exposed may be defined as a contracted state. Alternatively, according to various other embodiments, the state in which the first portion 410b and the second portion 411b of the display 413b are exposed and in which the third portion 412b thereof is not exposed and the state in which the first portion 410b and the third portion 412b of the display 413b are exposed and in which the second portion 411b thereof is not exposed may be defined as an extended state.

Referring to FIG. 4C, an electronic device 400c in FIG. 4C may include a first display 410c and a second display 420c. According to various embodiments, the first display 410c of the electronic device 400c may be extendable in the +y direction at one side thereof, similarly to the electronic device 400a in FIG. 4A, or may be extendable in the −y direction and the +y direction, respectively, at two sides thereof, similarly to the electronic device 400b in FIG. 4B. When the display of the electronic device 400c in FIG. 4C is in the contracted state, only a portion of the first display 410c may be exposed and the second display 420c, as well as the remaining portions of the first display 410c, may not be exposed. According to various embodiments, the electronic device 400c in FIG. 4C may be extendable in the +z direction. When the electronic device 400c in FIG. 4C is in the extended state, at least a portion of the first display 410c and at least a portion of the second display 420c may be exposed. According to various embodiments, the state in which the first display 410c is extended in at least one of the −y direction and the +y direction or in which the second display 420c is exposed may be defined as the extended state. Alternatively, according to various other embodiments, the state in which the first display 410c is not extended in at least one of the −y direction and the +y direction or in which the second display 420c is not exposed may be defined as the contracted state.

Although a slidable electronic device has been described in FIGS. 2A, 2B, 3, 4A, 4B, and 4C, the electronic device according to various embodiments is not limited to the slidable electronic device capable of being extendable as shown in FIGS. 2A, 2B, 3, 4A, 4B, and 4C. In addition, the electronic device according to various embodiments is not limited to the slidable electronic device and may include any electronic device capable of varying the display area exposed to a user by another operation in addition to the sliding operation, such as a foldable electronic device.

Figure 5A:
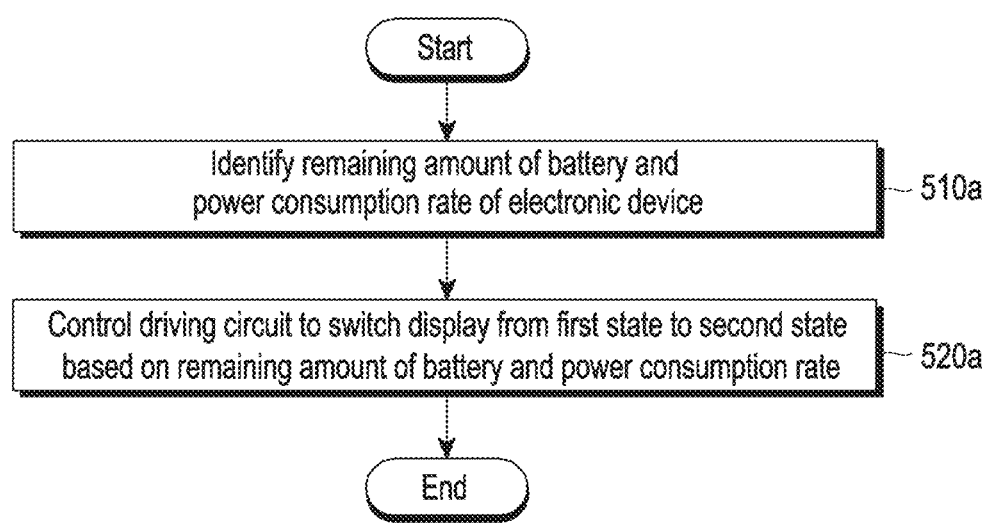
FIG. 5A is a flowchart illustrating an operation performed in an electronic device according to an embodiment of the disclosure.

FIG. 5A is a flowchart illustrating an operation performed in an electronic device according to an embodiment of the disclosure.

Referring to FIG. 5A, in operation 510a, at least one processor (e.g., the processor 120) of an electronic device (e.g., the electronic device 101) may identify a remaining amount of battery of the electronic device 101 and a power consumption rate of the electronic device 101.

According to various embodiments, at least one processor 120 may identify a power consumption rate of the electronic device 101, based on one or more applications being executed. Specifically, a power consumption rate of each of one or more applications installed in the electronic device 101 may be stored in a memory (e.g., the memory 130) of the electronic device 101, and at least one processor 120 may identify a power consumption rate of the electronic device 101 with reference to the memory 130, based on the power consumption rates of one or more running applications. According to various embodiments, the memory 130 may classify a plurality of applications into a plurality of groups of high, medium, or low power consumption rates and store information indicating the groups to which the respective applications belong. For example, a camera application, a video application, and a game application may correspond to a relatively high power consumption rate. For example, a social media application and a chat application may correspond to a medium power consumption rate. For example, a web surfing application may correspond to a relatively low power consumption rate. According to various embodiments, the memory 130 may store numerical values representing the power consumption rates for a plurality of applications.

According to various embodiments, at least one processor 120 may identify a power consumption rate of the electronic device 101, based on at least one application running in the foreground from among one or more running applications. For example, if there is one application running in the foreground, at least one processor 120 may identify a power consumption rate corresponding to the corresponding application as the power consumption rate of the electronic device 101. In another example, if there are multiple applications running in the foreground, at least one processor 120 may identify a power consumption rate of an application having the highest power consumption rate, as the power consumption rate of the electronic device 101, from among the multiple applications running in the foreground. In another example, if there are multiple applications running in the foreground, at least one processor 120 may identify a sum of the power consumption rates of the multiple applications running in the foreground as the power consumption rate of the electronic device 101.

In operation 520a, at least one processor 120 may control a driving circuit 181 to switch the display module 160 from a first state to a second state, based on the remaining amount of battery and the power consumption rate. Here, the first state may be the extended state, and the second state may be the contracted state. According to various embodiments, the first state may be a state in which the display has a first brightness, and the second state may be a state in which the display has a second brightness, which is less than the first brightness.

Although not shown in operation 520a, according to various embodiments, at least one processor 120, when performing operation 520a, may display a visual indicator indicating that the display module 160 is to switch to the contracted state to protect the electronic device 101 on the display module 160. The visual indicator may include, for example, at least one of a message or an icon.

According to various embodiments, in response to identifying that the remaining amount of battery is less than a first level and that the power consumption rate is greater than or equal to a first rate, at least one processor 120 may control the driving circuit 181 to switch the display module 160 from the first state to the second state. According to various other embodiments, if the remaining amount of battery is identified to be less than the first level, at least one processor 120 may control the driving circuit 181 to switch the display module 160 from the first state to the second state, regardless of the power consumption rate. Since the battery consumption rate is high when the display module 160 is in the first state because the display area thereof is greater than that when the display module 160 is in the second state, at least one processor 120 may switch the display module 160 from the first state to the second state to save battery power.

Figure 5B:
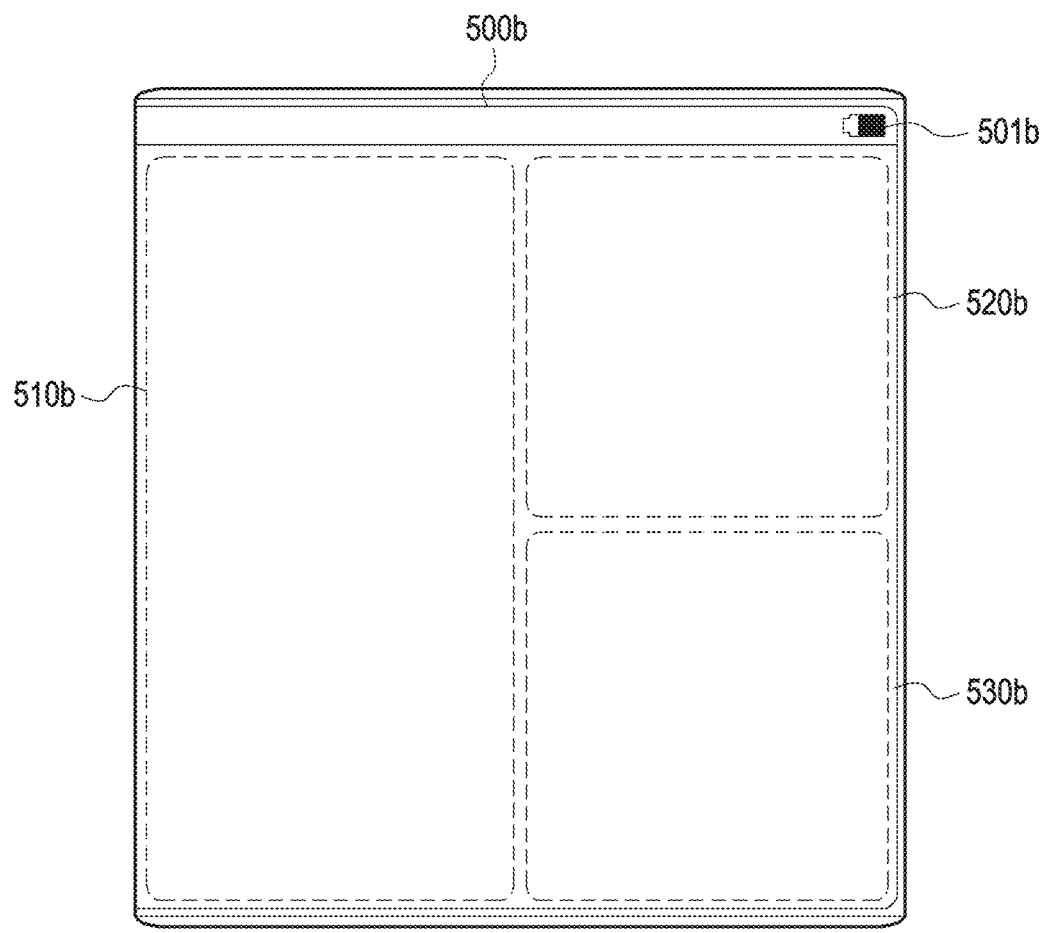
FIG. 5B illustrates a screen displayed on a display when the display is in an extended state in an electronic device according to an embodiment of the disclosure.
Figure 5C:
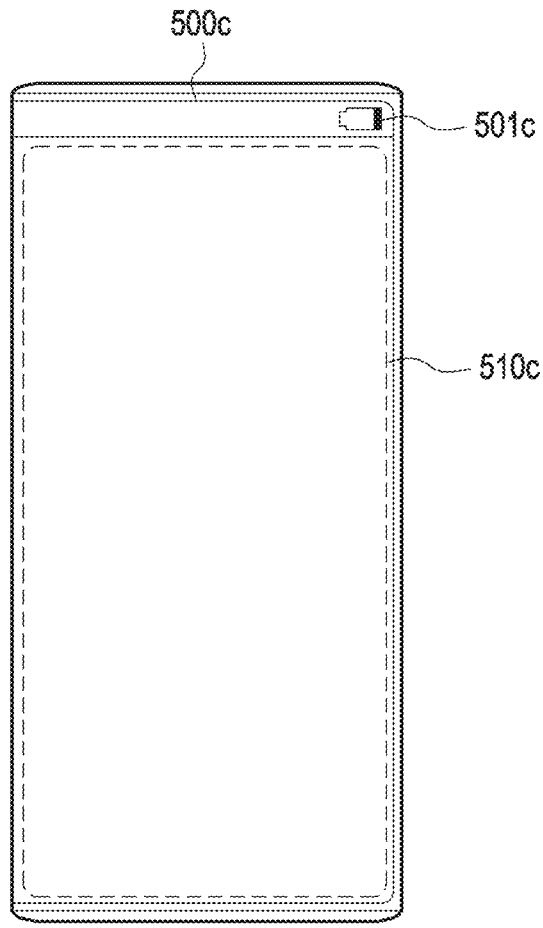
FIG. 5C illustrates a screen displayed on a display when the display is in a contracted state in an electronic device according to an embodiment of the disclosure.

FIG. 5B illustrates a screen displayed on a display when the display is in an extended state in an electronic device according to an embodiment of the disclosure. FIG. 5C illustrates a screen displayed on a display after the display shown in FIG. 5B has switched to a contracted state in an electronic device according to an embodiment of the disclosure.

Referring to FIG. 5B, an indicator 501b indicating the remaining amount of battery, a first window 510b, a second window 520b, and a third window 530c may be displayed on a display 500b in an extended state. Execution screens of different applications may be displayed in the first window 510b, the second window 520b, and the third window 530c, respectively. In other words, an executing screen of a first application may be displayed in the first window 510b, an executing screen of a second application may be displayed in the second window 520b, and an executing screen of a third application may be displayed in the third window 530c.

Referring to FIG. 5C, after the display 500b in the extended state switches to the contracted state by operation 520a in FIG. 5A, the display area of the display 500c in the contracted state may be less than the display area of the display 500b in the extended state. After the display 500b in the extended state of FIG. 5B switches to the contracted state, an indicator 501c indicating the remaining amount of battery and a single window 510c may be displayed on the display 500c in the contracted state. The execution screen of an application that was being activated, among the first application, the second application, and the third application before operation 520a in FIG. 5A is performed may be displayed in the window 520c. According to various embodiments, in addition to the example in which a single window 510c is displayed as shown in FIG. 5C, a plurality of windows fewer than the windows in the extended state may be displayed on the display according to priority thereof after the display switches to the contracted state. For example, among the applications corresponding to a plurality of windows displayed in the extended state, a more recently executed application may have a higher priority. For example, among the applications corresponding to a plurality of windows displayed in the extended state, a more frequently executed application may have a higher priority. For example, among the applications corresponding to a plurality of windows displayed in the extended state, an application executed for a longer time may have a higher priority.

According to various embodiments, in addition to the example in which three windows are displayed as shown in FIG. 5B, in the case where a plurality of windows is displayed on the display when the display is in the extended state, windows fewer than those in the extended state may be displayed after the display switches to the contracted state as shown in FIG. 5C.

Figure 5D:
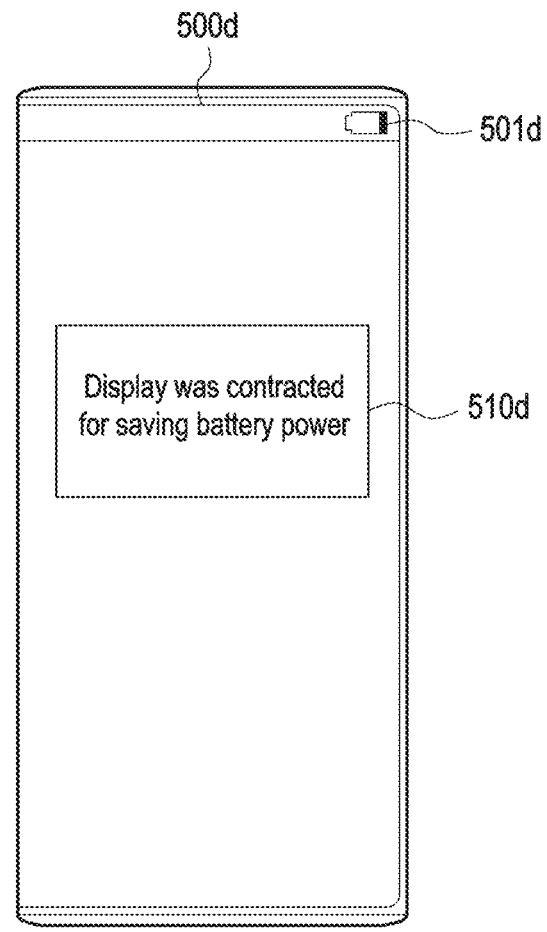
FIG. 5D illustrates a screen displayed after an electronic device switches from an extended state to a contracted state according to an embodiment of the disclosure.

FIG. 5D illustrates a screen displayed after an electronic device switches from an extended state to a contracted state according to an embodiment of the disclosure.

Referring to FIG. 5D, the display 500d having switched from the extended state to the contracted state may display an indicator 501d indicating the remaining amount of battery and a visual indicator 510d indicating that the display 500d has switched to the contracted state thereon.

Figure 6A:
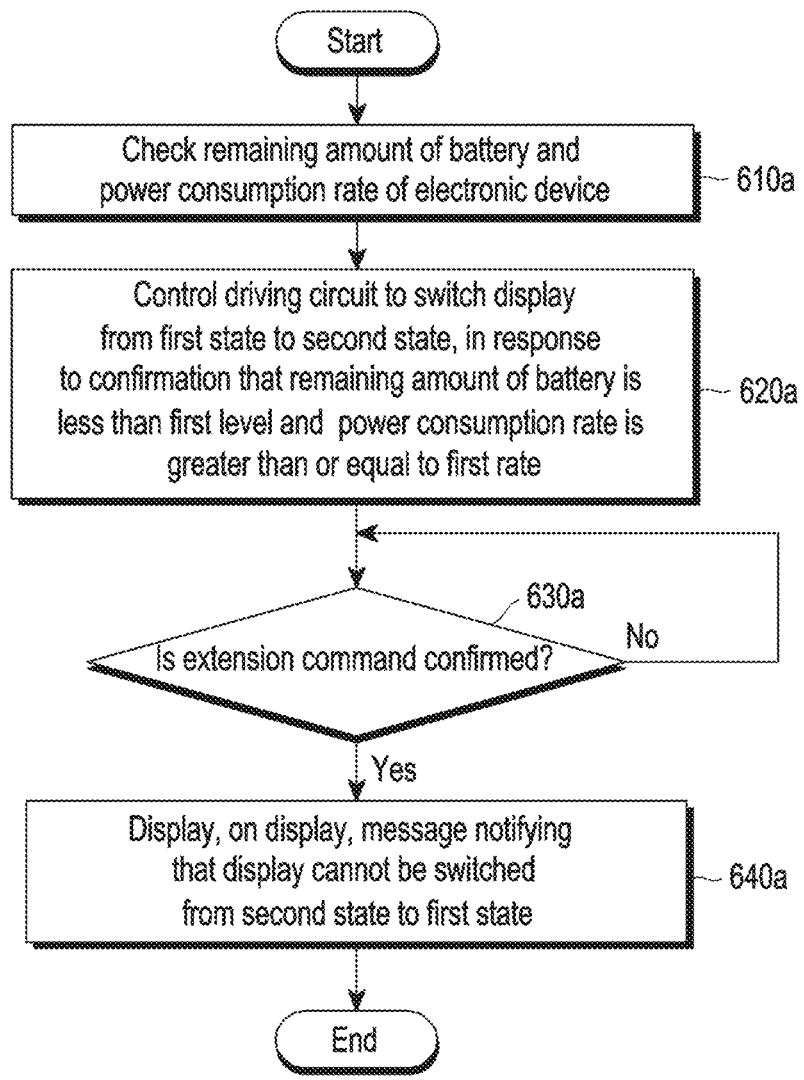
FIG. 6A is a flowchart illustrating an operation performed in an electronic device according to an embodiment of the disclosure.
Figure 6B:
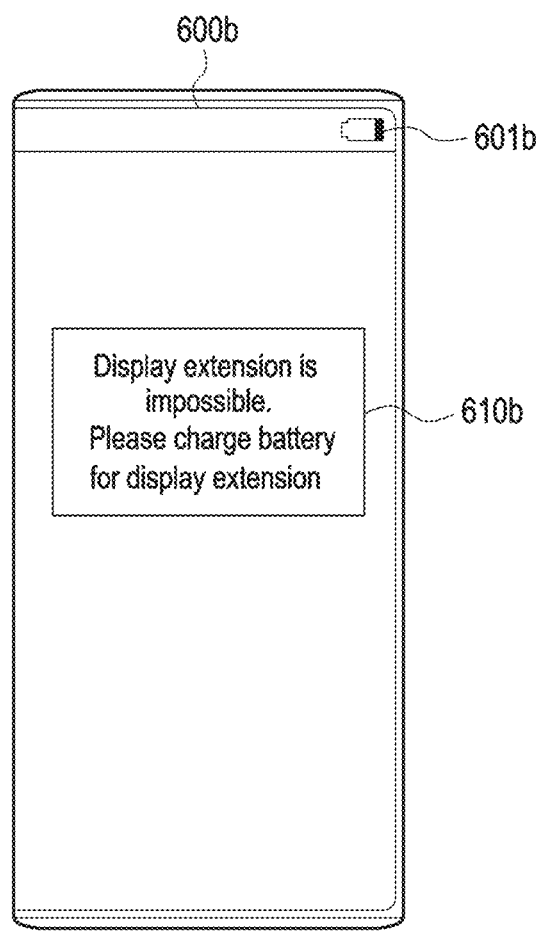
FIGS. 6B and 6C illustrate screens displayed on a display of an electronic device according to various embodiments of the disclosure.
Figure 6C:
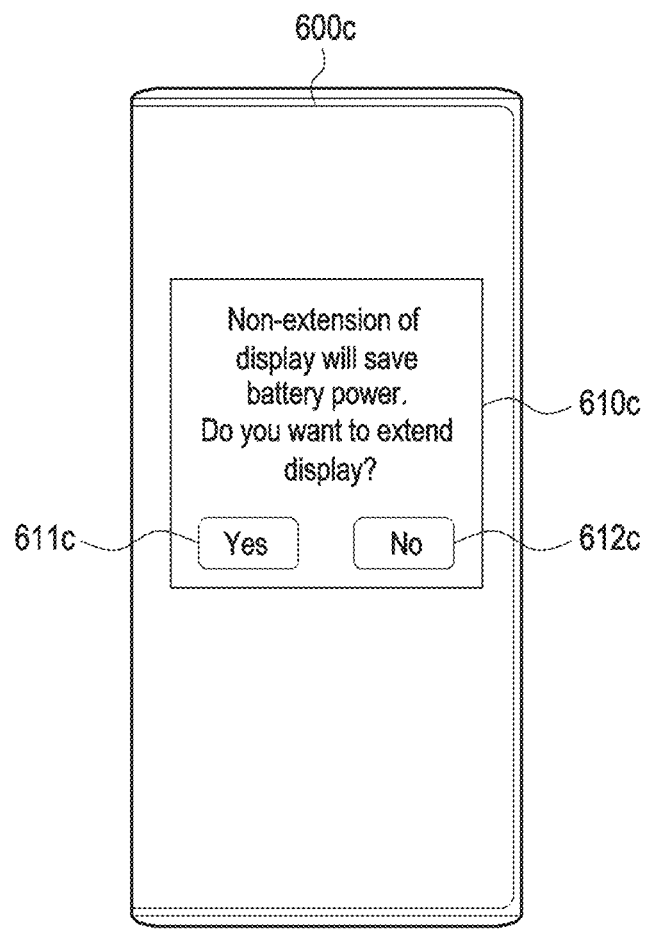

FIG. 6A is a flowchart illustrating an operation performed in an electronic device according to an embodiment of the disclosure. FIGS. 6B and 6C illustrate screens displayed on a display of an electronic device according to various embodiments of the disclosure.

Referring to FIGS. 6A, 6B, and 6C, in operation 610a, at least one processor (e.g., the processor 120) of an electronic device (e.g., the electronic device 101) may identify a remaining amount of battery of the electronic device 101 and a power consumption rate of the electronic device 101. The details of operation 510a in FIG. 5A may be applied to operation 610a in the same manner.

In operation 620a, in response to identifying that the remaining amount of battery is less than a first level and that the power consumption rate is greater than or equal to a first rate, at least one processor 120 may control the driving circuit 181 to switch the display module 160 from the first state to the second state. The details of operation 520a in FIG. 5A may be applied to operation 620a in the same manner.

In operation 630a, at least one processor 120 may identify whether or not an extension command is identified. According to various embodiments, the extension command may include a user input for switching the display module 160 from the second state to the first state. For example, if a user selects a display extension function through a configuration menu of the electronic device 101, at least one processor 120 may identify that an extension command has occurred. According to various embodiments, if it is identified that conditions for switching the display module 160 from the second state to the first state are satisfied in relation to at least one application running in the electronic device 101, at least one processor 120 may identify that an extension command has occurred. For example, if the user selects an UI indicating a full screen in a video application, at least one processor 120 may identify that an extension command has occurred in relation to the video application.

If an extension command is not identified in operation 630a, at least one processor 120 may repeat operation 630a until the extension command is identified.

If an extension command is identified in operation 630a, at least one processor 120 may display, on the display module 160, a message notifying that the display module 160 is unable to switch from the second state to the first state in operation 640a. In operation 640a, at least one processor 120 may not switch the display module 160 from the second state to the first state even with the extension command identified in operation 630a. For example, as shown in FIG. 6B, an indicator 601b indicating the remaining amount of battery and a message 610b notifying that the display 600b is unable to switch from the second state to the first state may be displayed on the display 600b.

Since the battery consumption rate is high when the display module 160 is in the first state because the display area thereof is greater than that when the display module 160 is in the second state, at least one processor 120 may not switch the display module 160 from the second state to the first state even with the extension command, thereby saving battery power.

Alternatively, unlike the displaying of a message notifying that at least one processor 120 is unable to switch the display module 160 from the second state to the first state in operation 630a, according to various embodiments, at least one processor 120 may display, on the display module 160, a user interface asking the user to confirm whether or not to switch the display module 160 from the second state to the first state. For example, as shown in FIG. 6C, an indicator 601c indicating the remaining amount of battery and a pop-up 610c asking the user to confirm whether or not to extend the display 600c may be displayed on the display 600c. The pop-up 610c may include a user interface 611c for identifying a user response corresponding to extension of the display 600c and a user interface 612c for identifying a user response corresponding to non-extension of the display 600c.

Figure 7:
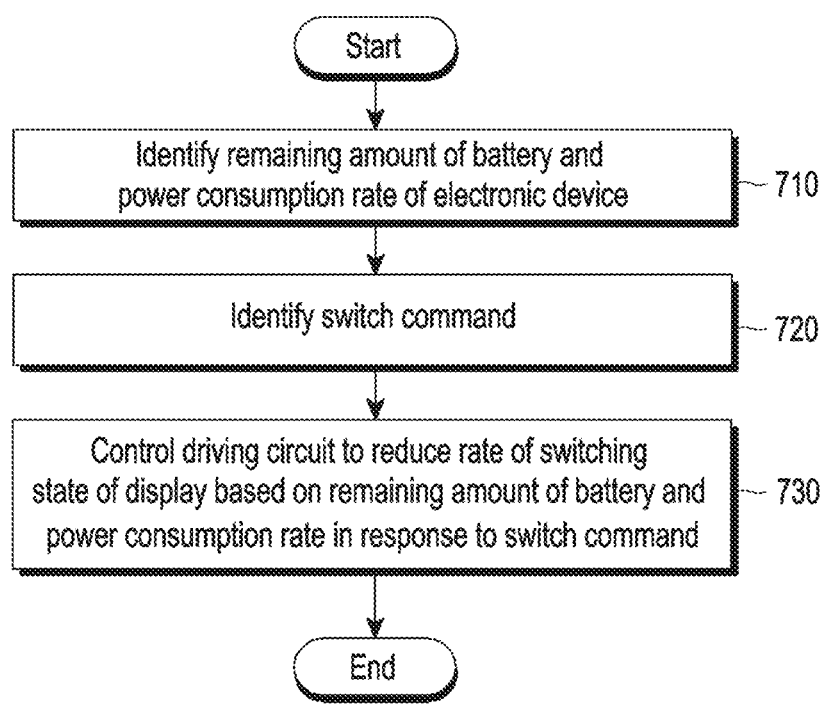
FIG. 7 is a flowchart illustrating an operation performed in an electronic device according to an embodiment of the disclosure.

FIG. 7 is a flowchart illustrating an operation performed in an electronic device according to an embodiment of the disclosure.

Referring to FIG. 7, in operation 710, at least one processor (e.g., the processor 120) of an electronic device (e.g., the electronic device 101) may identify a remaining amount of battery of the electronic device 101 and a power consumption rate of the electronic device 101. The details of operation 510a in FIG. 5A may be applied to operation 710 in the same manner.

In operation 720, at least one processor 120 may identify a switch command According to various embodiments, the switch command may include an extension command for switching the display module 160 from the second state to the first state and a contraction command for switching the display module 160 from the first state to the second state. Here, the first state may be the extended state, and the second state may be the contracted state.

According to various embodiments, the display module 160 of the electronic device 101 may be configured to switch from the extended state to the contracted state by the operation of the driving circuit 181 and to switch from the contracted state to the extended state by the operation of the driving circuit 181. In this case, the switch command may include an extension command that is a user input for switching from the contracted state to the extended state and a contraction command that is a user input for switching from the extended state to the contracted state.

According to various embodiments, the display module 160 of the electronic device 101 may be configured to switch from the extended state to the contracted state by the operation of the driving circuit 181 and to switch from the contracted state to the extended state by applying an external force to the electronic device 101 by the user, instead of the operation of the driving circuit 181. In this case, the switch command may include a contraction command that is a user input for switching from the extended state to the contracted state. The external force applied by the user to switch the display module 160 from the contracted state to the extended state may not be included in the switch command.

According to various embodiments, the display module 160 of the electronic device 101 may be configured to switch from the contracted state to the extended state by the operation of the driving circuit 181 and to switch from the extended state to the contracted state by applying an external force to the electronic device 101 by the user, instead of the operation of the driving circuit 181. In this case, the switch command may include an extension command that is a user input for switching from the contracted state to the extended state. The external force applied by the user to switch the display module 160 from the extended state to the contracted state may not be included in the switch command.

According to various embodiments, the display module 160 of the electronic device 101 may be configured to switch from the contracted state to the extended state by applying an external force to the electronic device 101 by the user, instead of the operation of the driving circuit 181, and to switch from the extended state to the contracted state by applying an external force to the electronic device 101 by the user, instead of the operation of driving circuit 181. In this case, the external force applied by the user to switch the display module 160 from the contracted state to the extended state and the external force applied by the user to switch the display module 160 from the extended state to the contracted state may not be included in the switch command.

The details described with reference to operation 630*a* in FIG. 6A may be applied to the extension command in the same manner Similar to the extension command described with reference to operation 630*a* in FIG. 6A, the contraction command may include a user input for switching the display module 160 from the first state to the second state. For example, if the user selects a display contraction function through a configuration menu of the electronic device 101 when the display module 160 is in the first state, at least one processor 120 may identify that an extension command has occurred. In addition, similar to the extension command, if it is identified that conditions for switching the display module 160 from the first state to the second state are satisfied in relation to at least one application running in the electronic device 101, at least one processor 120 may identify that a contraction command has occurred. For example, if a video call is performed through a video call application when the display module 160 is in the first state and if the video call is terminated afterwards, at least one processor 120 may identify that a contraction command has occurred in relation to the video call application.

In operation 730, in response to a switch command, at least one processor 120 may control the driving circuit 181 to reduce the rate of switching the state of the display module 160, based on the remaining amount of battery and the power consumption rate. For example, at least one processor 120 may control the driving circuit 181 to reduce the driving rate of a motor for switching the display module 160 from the extended state to the contracted state or control the driving circuit 181 to reduce the driving rate of a motor for switching the display module 160 from the contracted state to the extended state. Here, switching the state of the display module 160 may include switching the display module 160 from the first state to the second state and switching the display module 160 from the second state to the first state.

According to various embodiments, based on identifying that the remaining amount of battery is greater than or equal to a first level and less than a second level and that the power consumption rate is greater than or equal to a first rate, at least one processor 120 may control the driving circuit 181 to reduce the rate of switching the state of display module 160 in response to a switch command Here, the second level may be configured to be higher than the first level.

According to various embodiments, based on identifying that the remaining amount of battery is less than a first level and that the power consumption rate is less than a first rate, at least one processor 120 may control the driving circuit 181 to reduce the rate of switching the state of the display module 160 in response to a switch command.

When the voltage applied to a rotating member (e.g., the roller 251) by the operation of the driving circuit 181 is constant, the higher the angular velocity of the rotating member (e.g., the roller 251) rotating to switch the state of the display module 160, the lower the torque applied to the rotating member (e.g., the roller 251), and the lower the angular velocity of the rotating member (e.g., the roller 251), the higher the torque applied to the rotating member (e.g., the roller 251). In addition, when the torque applied to the rotating member (e.g., the roller 251) is constant, a high voltage is required to be applied to the rotating member (e.g., the roller 251) in order to increase the angular velocity of the rotating member (e.g., the roller 251) to switch the state of the display module 160. In operation 730, at least one processor 120 may control the driving circuit 181 to reduce the rate of switching the state of the display module 160 in response to a switch command, thereby reducing power consumed by the driving circuit 181 and saving battery power according thereto.

Figure 8:
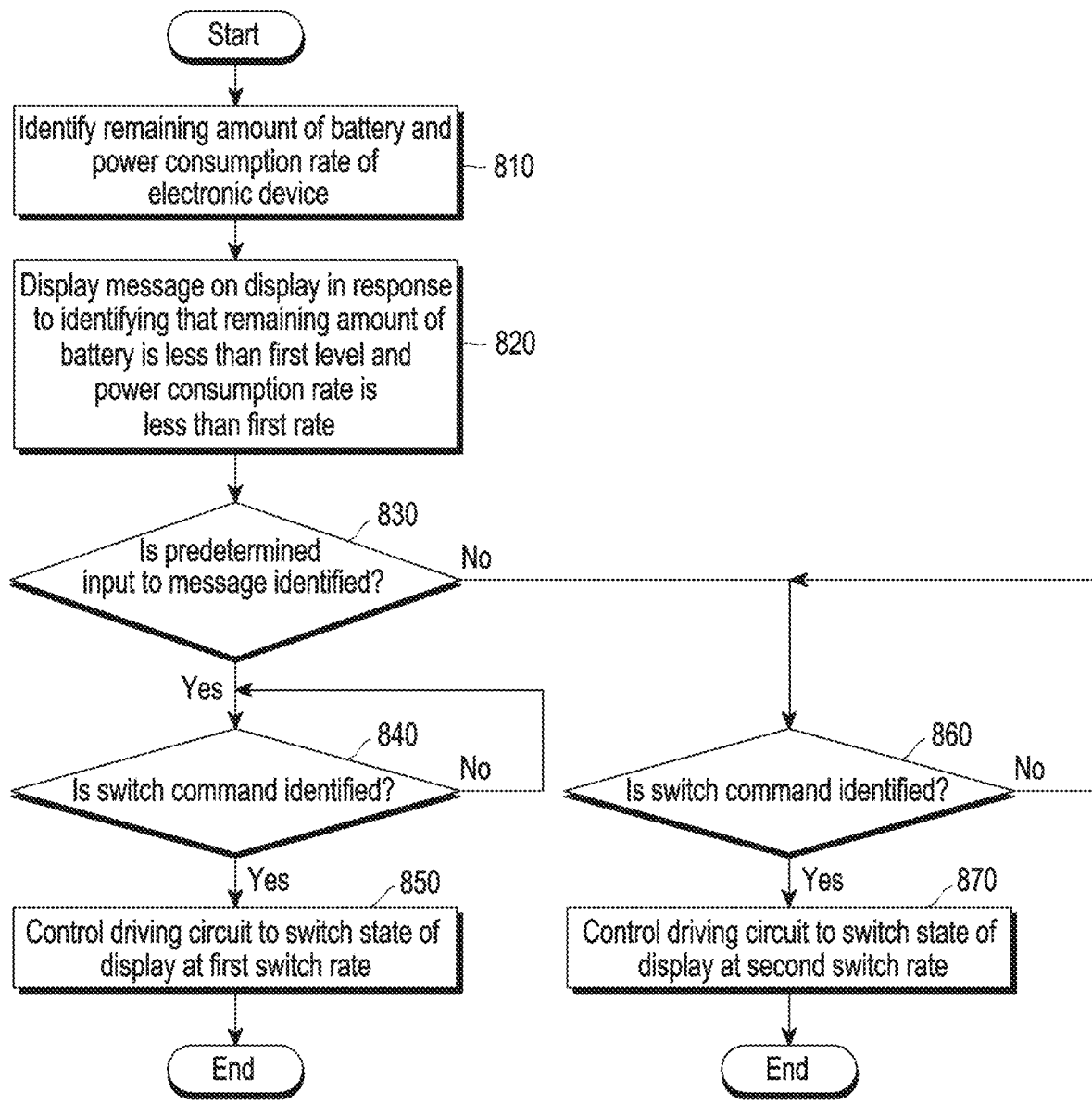
FIG. 8 is a flowchart illustrating an operation performed in an electronic device according to an embodiment of the disclosure.

FIG. 8 is a flowchart illustrating an operation performed in an electronic device according to an embodiment of the disclosure.

Referring to FIG. 8, in operation 810, at least one processor (e.g., the processor 120) of an electronic device (e.g., the electronic device 101) may identify a remaining amount of battery of the electronic device 101 and a power consumption rate of the electronic device 101. The details of operation 510*a* in FIG. 5A may be applied to operation 810 in the same manner.

In operation 820, in response to identifying that the remaining amount of battery is less than a first level and that the power consumption rate is less than a first rate, at least one processor 120 may display a message on a display (e.g., the display module 160).

According to various embodiments, the message according to operation 820 may be a message asking the user whether or not to reduce the rate of switching the state of the display between the first state and the second state.

Figure 9:
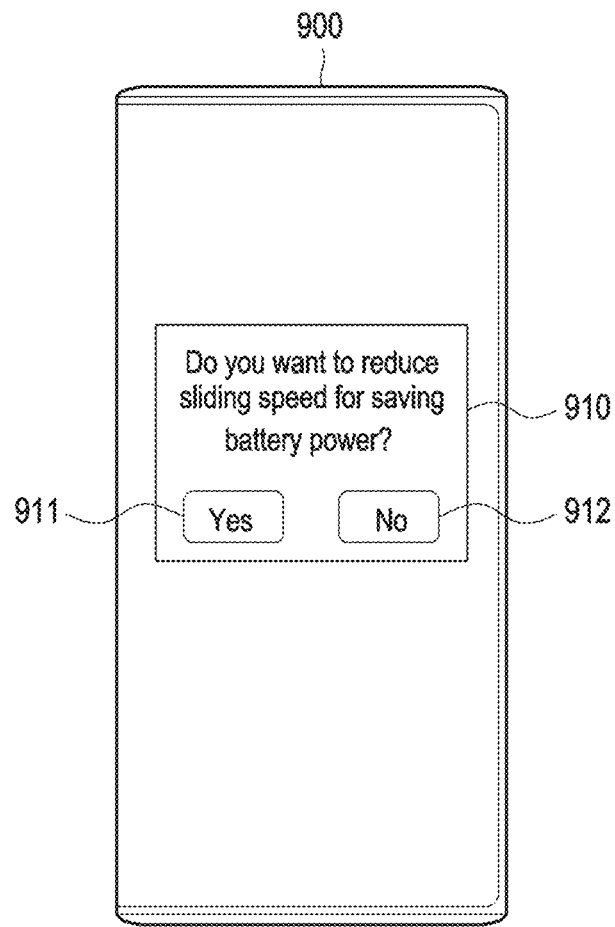
FIG. 9 illustrates a screen displayed on a display of an electronic device according to an embodiment of the disclosure.

FIG. 9 illustrates a screen displayed on a display of an electronic device according to an embodiment of the disclosure. Specifically, FIG. 9 illustrates an example of a screen on which a message according to operation 820 is displayed.

Referring to FIG. 9, a message 910 asking the user whether or not to reduce the rate of switching the state of the display between the first state and the second state and user interfaces 911 and 912 for the user to input a response to the message 910 may be displayed on a screen 900.

According to various embodiments, instead of operation 820, based on identifying that the remaining amount of battery is greater than or equal to a first level and less than a second level and that the power consumption rate is greater than or equal to a first rate, at least one processor 120 may display a message on the display module 160.

In operation 830, at least one processor 120 may identify whether or not there is a predetermined input to the message 910. According to various embodiments, the predetermined input may indicate that the user agrees to reducing the rate of switching the state of the display between the first state and the second state. Referring back to FIG. 9, if the user selects the user interface 911, at least one processor 120 may identify that there was a predetermined input to the message 910 and perform operation 840. Alternatively, if the user selects the user interface 912, at least one processor 120 may identify that a predetermined input has not been made to the message 910 and perform operation 860.

In operation 840, at least one processor 120 may identify whether or not a switch command is identified. The definition of the switch command has been described with reference to operation 720 in FIG. 7. If the switch command is not identified in operation 840, at least one processor 120 may repeat operation 840 until the switch command is identified.

If a switch command is identified in operation 840, at least one processor 120 may control the driving circuit 181 to switch the state of the display module 160 at a first switch rate in operation 850. Here, the first switch rate may be lower than a second switch rate, which will be described later with reference to operation 870.

In operation 860, at least one processor 120 may identify whether or not a switch command is identified. The definition of the switch command has been described with reference to operation 720 in FIG. 7. If the switch command is not identified in operation 860, at least one processor 120 may repeat operation 860 until the switch command is identified.

If a switch command is identified in operation 860, at least one processor 120 may control the driving circuit 181 to switch the state of the display module 160 at a second switch rate in operation 870. Here, the second switch rate may higher than the first switch rate described with reference to operation 850.

According to the operations in FIG. 8, the electronic device 101 may display the message 910 asking the user whether or not to reduce the rate of switching the state of the display between the first state and the second state and, if the user agrees to the message 910, reduce the rate of switching the state of the display between the first state and the second state, so that the user may choose one of the rate of switching the state of the display between the first state and the second state, and saving battery power.

Figure 10A:
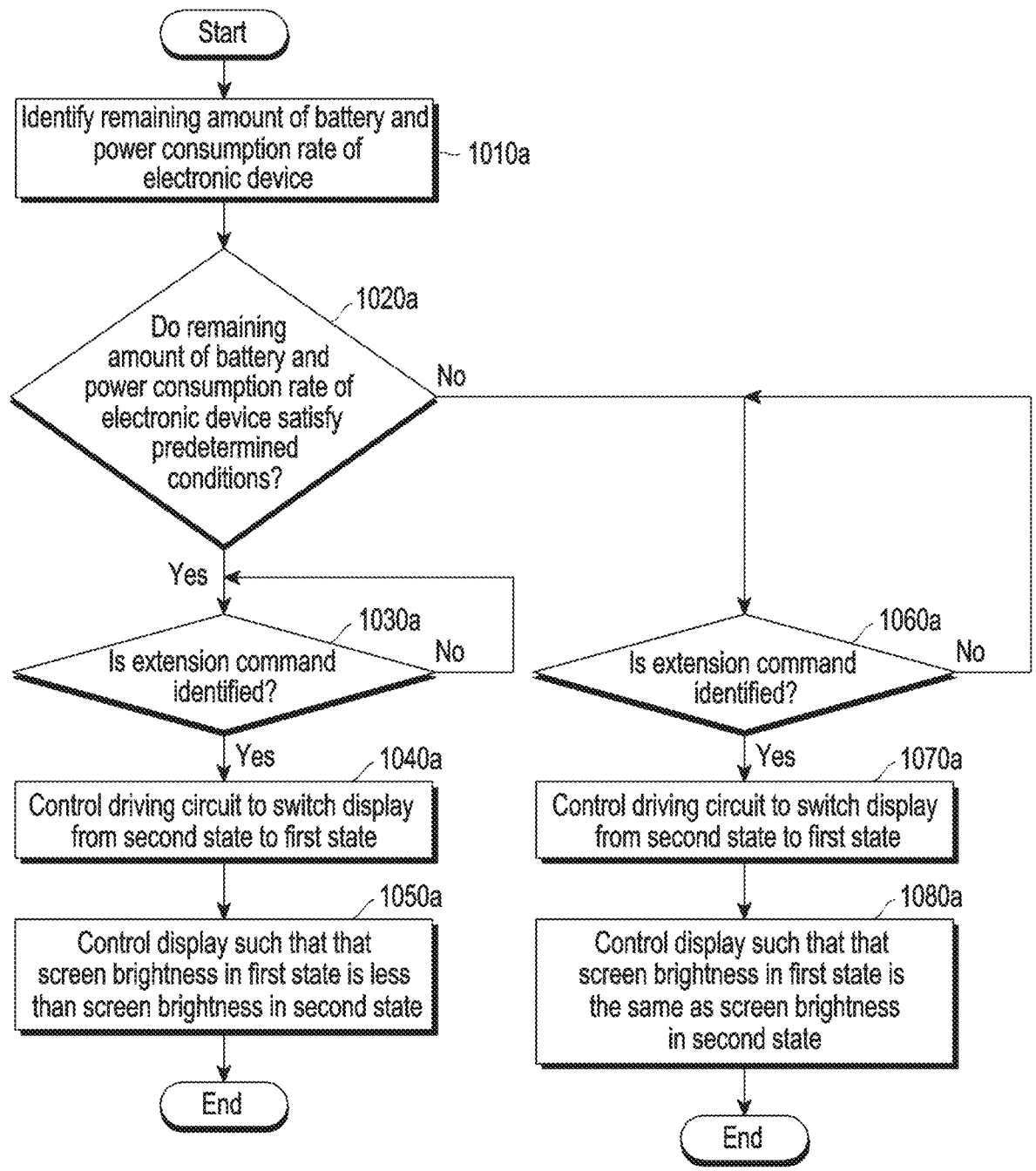
FIG. 10A is a flowchart illustrating an operation performed in an electronic device according to an embodiment of the disclosure.

FIG. 10A is a flowchart illustrating an operation performed in an electronic device according to an embodiment of the disclosure.

Referring to FIG. 10A, in operation 1010a, at least one processor (e.g., the processor 120) of an electronic device (e.g., the electronic device 101) may identify a remaining amount of battery of the electronic device 101 and a power consumption rate of the electronic device 101. The details of operation 510a in FIG. 5A may apply to operation 1010a in the same manner.

In operation 1020a, at least one processor 120 may identify whether or not the remaining amount of battery and the power consumption rate of the electronic device satisfy predetermined conditions. According to various embodiments, if it is identified that the remaining amount of battery is greater than or equal to a first level and less than a second level and that the power consumption rate is greater than or equal to a first rate, at least one processor 120 may identify that the predetermined conditions are satisfied. According to various embodiments, if it is identified that the remaining amount of battery is less than a first level and that the power consumption rate is less than a first rate, at least one processor 120 may identify that the predetermined conditions are satisfied.

If it is identified that the remaining amount of battery and the power consumption rate of the electronic device satisfy the predetermined conditions in operation 1020a, at least one processor 120 may perform operation 1030a. If it is identified that the remaining amount of battery and the power consumption rate of the electronic device do not satisfy the predetermined conditions in operation 1020a, at least one processor 120 may perform operation 1060a.

In operation 1030a, at least one processor 120 may identify whether or not there is an extension command. The definition of an extension command has been described with reference to operation 630a in FIG. 6A. If an extension command is not identified in operation 1030a, at least one processor 120 may repeat operation 1030a until the extension command is identified.

If an extension command is identified in operation 1030a, at least one processor 120 may control the driving circuit 181 to switch the display module 160 from the second state to the first state in operation 1040a. The first state of the display module 160 may be the extended state, and the second state thereof may be the contracted state. Subsequently, at least one processor 120 may control the display module 160 such that that the screen brightness in the first state is less than the screen brightness in the second state in operation 1050a.

In operation 1060a, at least one processor 120 may identify whether or not there is an extension command. The definition of the extension command has been described with reference to operation 630a in FIG. 6A. If an extension command is not identified in operation 1060a, at least one processor 120 may repeat operation 1060a until the extension command is identified.

If an extension command is identified in operation 1060a, at least one processor 120 may control the driving circuit 181 to switch the display module 160 from the second state to the first state in operation 1070a. The first state of the display module 160 may be the extended state, and the second state thereof may be the contracted state. Subsequently, in operation 1080a, at least one processor 120 may control the display module 160 such that the screen brightness in the first state is equal to the screen brightness in the second state.

According to the operations shown in FIG. 10A, the electronic device 101 may adjust, when extending the display module 160, the screen brightness after the extension to be less than that before the extension if predetermined conditions of operation 1020a are satisfied and may control, when extending the display module 160, such that the screen brightness before the extension is the same as that after the extension if the predetermined conditions in operation 1020a are not satisfied. Since the power consumption increases as the screen brightness increases, according to the operations shown in FIG. 10A, the electronic device 101 may reduce the power consumption in the case where the predetermined conditions of operation 1020a are satisfied, thereby caving battery power.

Figure 10B:
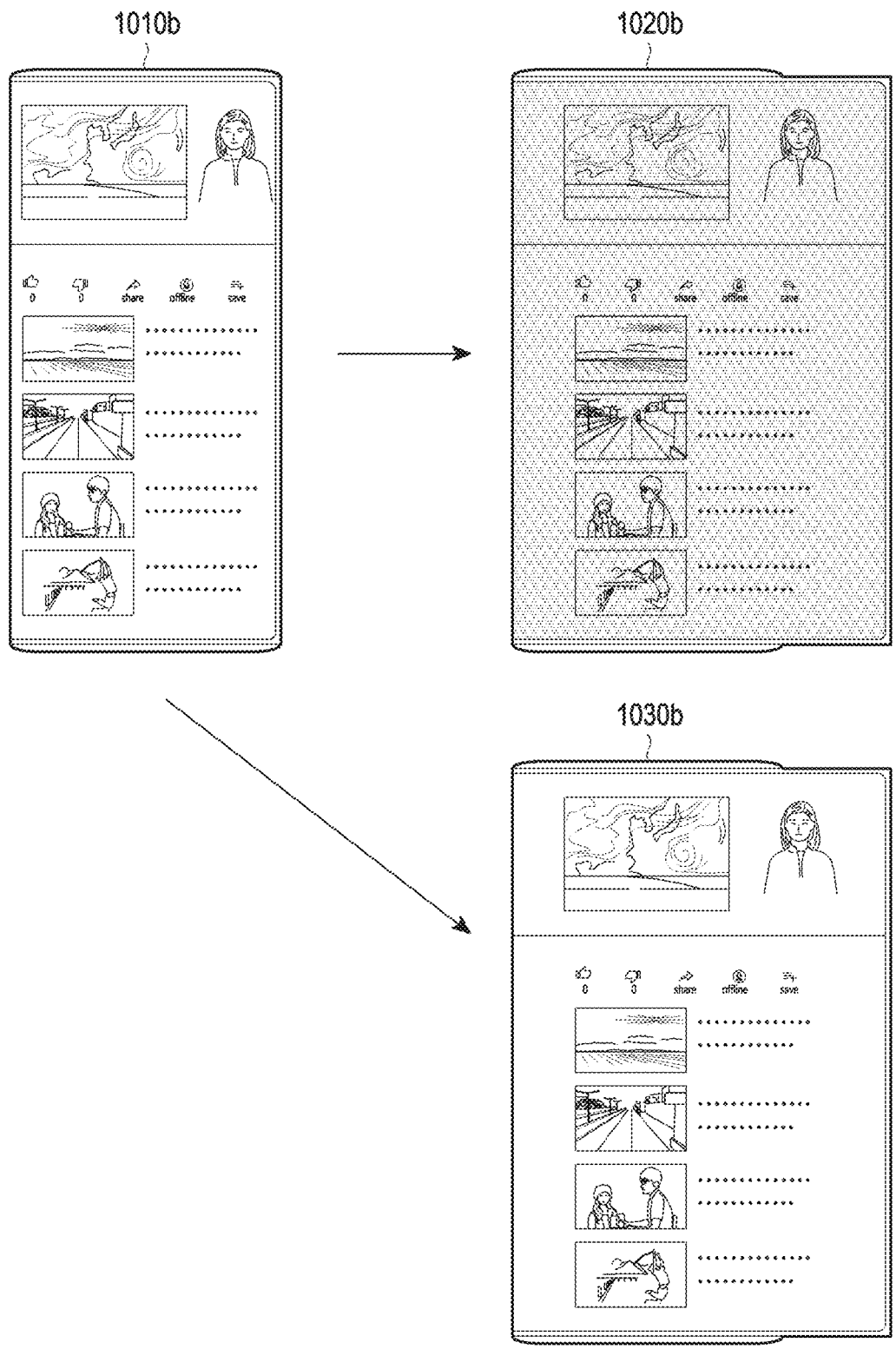
FIGS. 10B and 10C illustrate screens displayed on a display of an electronic device according to various embodiments of the disclosure.

FIG. 10B illustrates an electronic device performing operation 1050a or operation 1080a in FIG. 10A according to an embodiment of the disclosure.

Referring to FIG. 10B, the electronic device 1010b before performing operations 1040a and 1050a or operations 1070a and 1080a in FIG. 10A may display a screen at a first brightness in the second state. After performing operations 1040a and 1050a in FIG. 10A, the electronic device 1020b may display a screen at a second brightness, which is lower than the first brightness, in the first state. After performing operations 1070a and 1080a in FIG. 10A, the electronic device 1030b may display a screen at the first brightness in the first state.

Figure 10C:
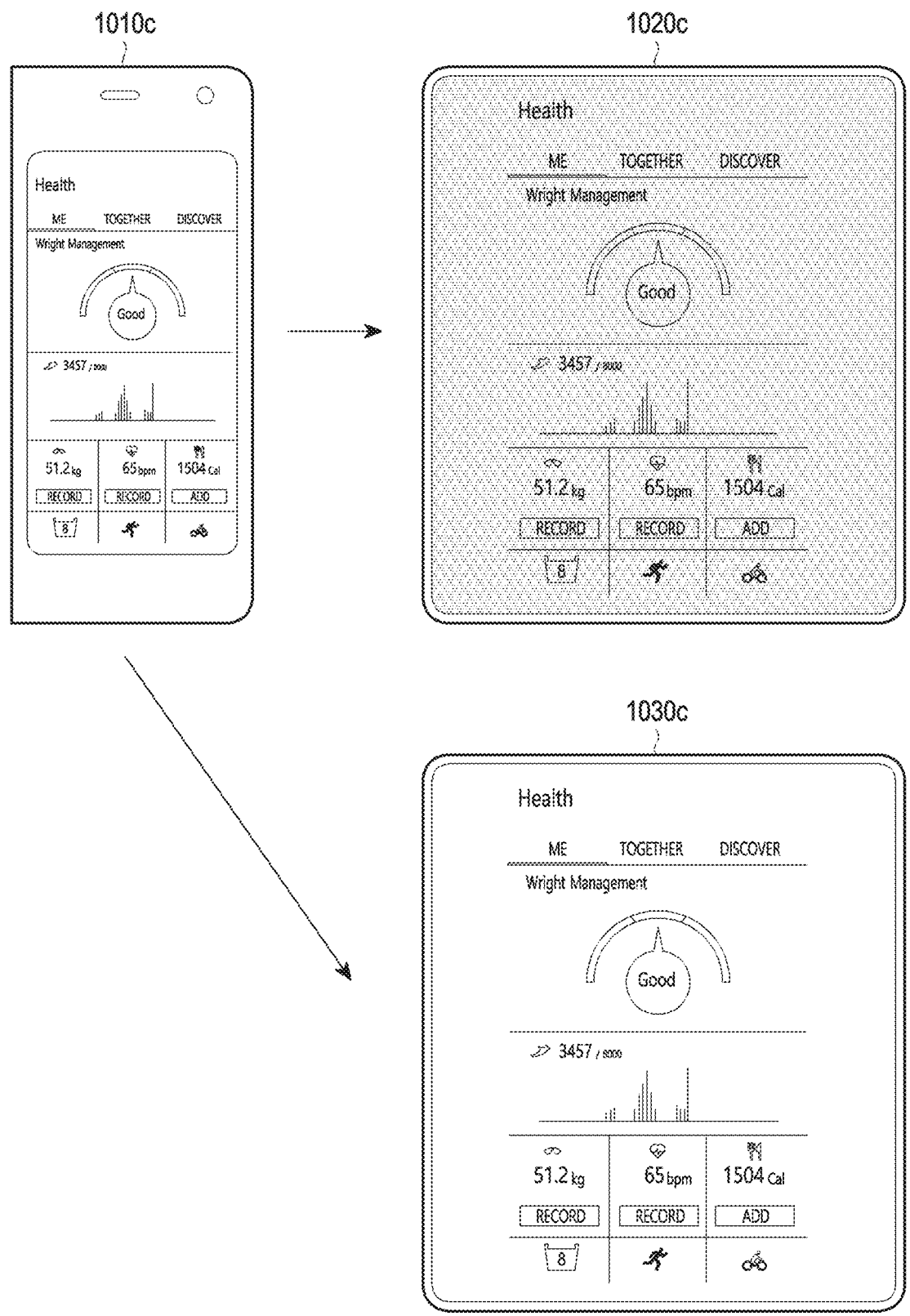

FIG. 10C illustrates an electronic device performing operation 1050a or operation 1080a in FIG. 10A according to an embodiment of the disclosure. The electronic device in FIG. 10B may be the electronic device described above with reference to FIGS. 2A and 2B, whereas the electronic device in FIG. 10C may be a foldable electronic device.

Referring to FIG. 10C, the second state in the electronic device may refer to a folded state of the electronic device, and the first state may refer to an unfolded state of the electronic device. Referring to FIG. 10C, the electronic device 1010c before performing operations 1040a and 1050a or operations 1070a and 1080a in FIG. 10A may display a screen at a first brightness in the second state. After performing operations 1040a and 1050a in FIG. 10A, the electronic device 1020c may display a screen at a second brightness lower than the first brightness in the first state. After performing operations 1070a and 1080a in FIG. 10A, the electronic device 1030c may display a screen at the first brightness in the first state.

According to various embodiments, the operations described above with reference to FIGS. 5A, 6A, 7, 8, and 10A may be performed in combination. According to various embodiments, operations according to any combination of FIGS. 5A, 6A, 7, 8, and 10A may be performed.

Figure 11A:
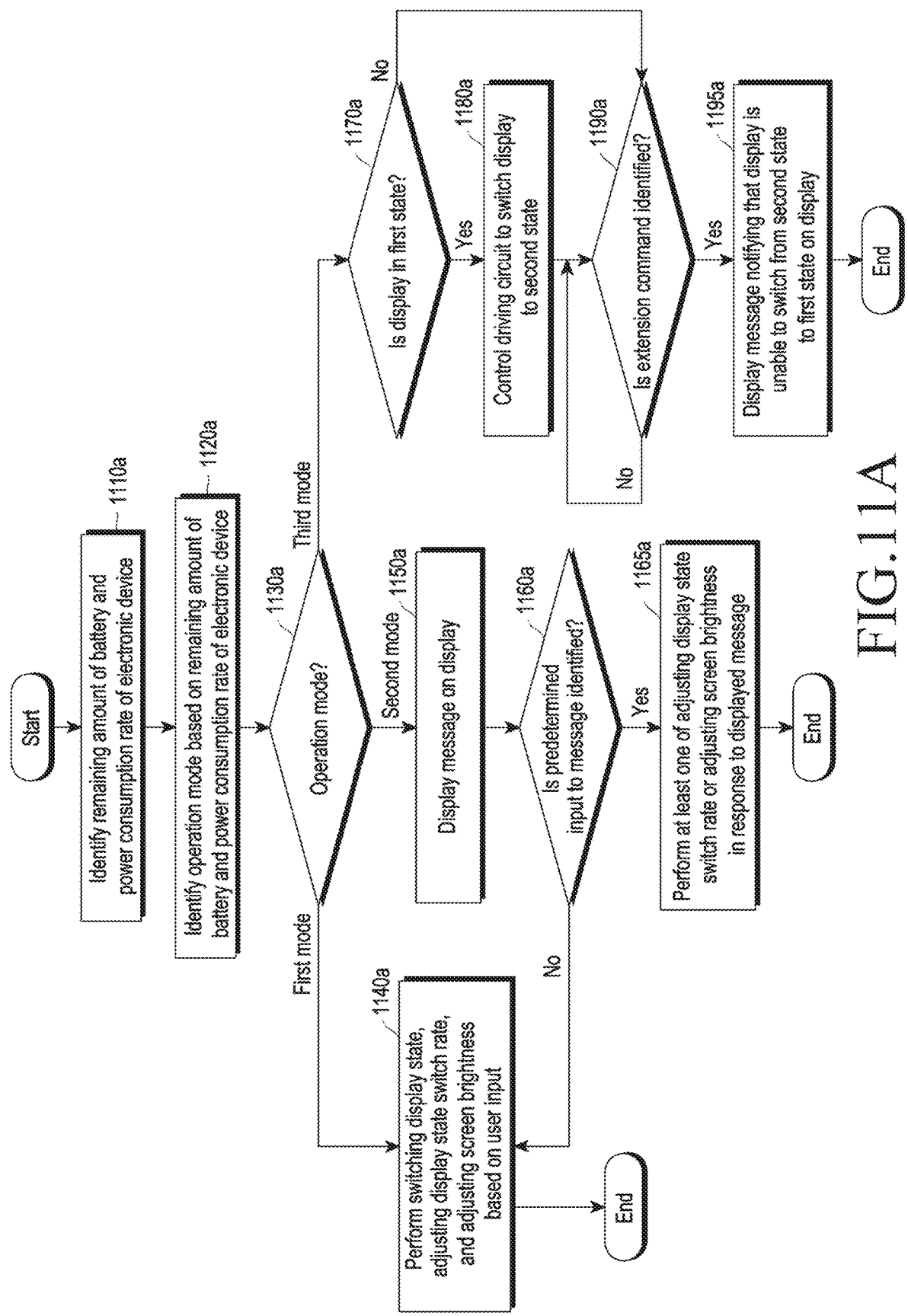
FIG. 11A is a flowchart illustrating an operation performed in an electronic device according to an embodiment of the disclosure.

FIG. 11A is a flowchart illustrating an operation performed in an electronic device according to an embodiment of the disclosure. Specifically, FIG. 11A describes operations performed by a combination of the operations shown in FIGS. 6A, 8, and 10A.

Referring to FIG. 11A, in operation 1110a, at least one processor (e.g., the processor 120) of an electronic device (e.g., the electronic device 101) may identify a remaining amount of battery of the electronic device 101 and a power consumption rate of the electronic device 101. The details of operation 510a in FIG. 5A may be applied to operation 1110a in the same manner.

In operation 1120a, the at least one processor 120 may identify an operation mode, based on the remaining amount of battery and the power consumption rate of the electronic device 101. According to various embodiments, a correlation between the remaining amount of battery, the power consumption rate of the electronic device 101, and the operation mode may be stored in the memory 130 of the electronic device 101, and at least one processor 120 may identify an operation mode corresponding to the remaining amount of battery and the power consumption rate identified in operation 1110a with reference to the memory 130. For example, there may be a correlation between the remaining amount of battery, the power consumption rate of the electronic device 101, and the operation mode as shown in Table 1.

TABLE 1

| | | Energy consumption rate | | |
|---|---|---|---|---|
| | | greater than or equal to second rate | greater than or equal to first rate and less than second rate | less than first rate |
| Remaining amount of battery | greater than or equal to second level | First mode | First mode | First mode |
| | greater than or equal to first level and less than second level | Second mode | First mode | First mode |
| | less than first level | Third mode | Third mode | Second mode |

Although Table 1 shows that the operation mode is a first mode when the remaining amount of battery is greater than or equal to a first level and less than a second level and when the power consumption rate is greater than or equal to a first rate and less than a second rate, according to various embodiments, the operation mode may be a second mode when the remaining amount of battery is greater than or equal to the first level and less than the second level and when the power consumption rate is greater than or equal to the first rate and less than the second rate. In addition, although Table 1 shows that the operation mode is the second mode when the remaining amount of battery is less than the first level and when the power consumption rate is less than the first rate, according to various embodiments, the operation mode may be a third mode when the remaining amount of battery is less than the first level and when the power consumption rate is less than the first rate. In addition, the correlation between the remaining amount of battery, the power consumption rate of the electronic device 101, and the operation mode may be defined differently from that shown in Table 1. In operation 1130a, at least one processor 120 may operate according to the operation mode identified in operation 1120a. If the operation mode identified in operation 1120a is the first mode, at least one processor 120 may perform operation 1140a. If the operation mode identified in operation 1120a is the second mode, at least one processor 120 may perform operation 1150a. If the operation mode identified in operation 1120a is the third mode, at least one processor 120 may perform operation 1170a.

In operation 1140a, at least one processor 120 may perform at least one of switching the display state, adjusting a display state switch rate, and adjusting screen brightness, based on a user input. In other words, when the operation mode is the first mode, the user may switch the display state, configure the display state switch rate, and configure the screen brightness without limitation. Specifically, in operation 1140a, the state of the display module 160 may switch according to a switch command, not limited to a specific state as shown in operation 520a in FIG. 5A or operation 620a or 640a in FIG. 6A. The switch command has been described with reference to operation 720 in FIG. 7. According to various embodiments, the screen brightness displayed on the display module 160 in operation 1140a may be any brightness selected according to a user input, not limited to a specific brightness as shown in operation 1050a in FIG. 10A. According to various embodiments, if a switch command is identified in operation 1140a, the display module 160 state switch rate may be any rate selected according to a user input, not limited to the slow rate shown in operation 730 in FIG. 7 or operation 850 in FIG. 8. According to various embodiments, the electronic device 101 may not provide an interface capable of adjusting the display module 160 state switch rate, and in this case, the display module 160 state switch rate in operation 1140a may be a predetermined rate, and the predetermined rate may be higher than the state switch rate corresponding to the case of adjusting the state switch rate in operation 1165. The display module 160 state switch rate in operation 1140a may be higher than the display module 160 state switch rate in operation 1165a, which will be described later.

In operation 1150a, at least one processor 120 may display a message on the display module 160. According to various embodiments, the message according to operation 1150a, as shown in FIG. 9, may be a message asking the user whether or not to reduce the rate of switching the state of the display module 160 between the first state and the second state. According to various embodiments, the message according to operation 1150a may be a message asking the user whether or not to lower the screen brightness when the display module 160 is in the first state. According to various embodiments, the message according to operation 1150a may be a message asking the user whether or not to perform both adjusting of the display state switch rate and adjusting of the screen brightness to save battery power.

Figure 11B:
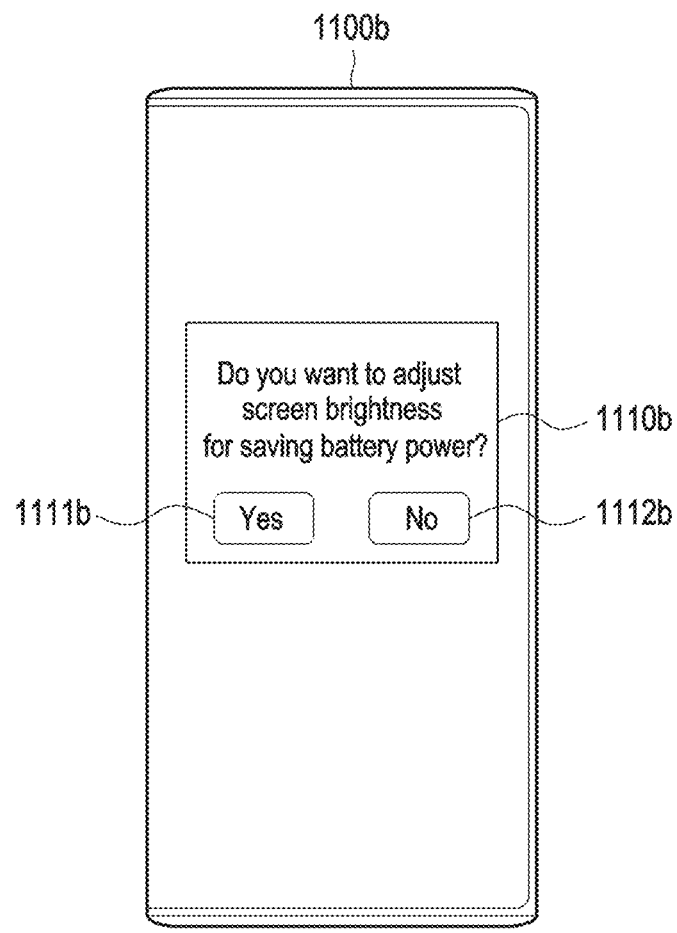
FIGS. 11B and 11C illustrate screens displayed on a display of an electronic device according to various embodiments of the disclosure.

FIG. 11B illustrates an electronic device performing operation 1150a according to an embodiment of the disclosure.

Referring to FIG. 11B, an electronic device 1100b performing operation 1150a may display a pop-up 1110b asking whether or not to adjust the screen brightness on the display. The pop-up 1110b may include a user interface 1111b to identify a user response corresponding to adjusting the screen brightness and a user interface 1112b to identify a user response corresponding to not adjusting the screen brightness.

Figure 11C:
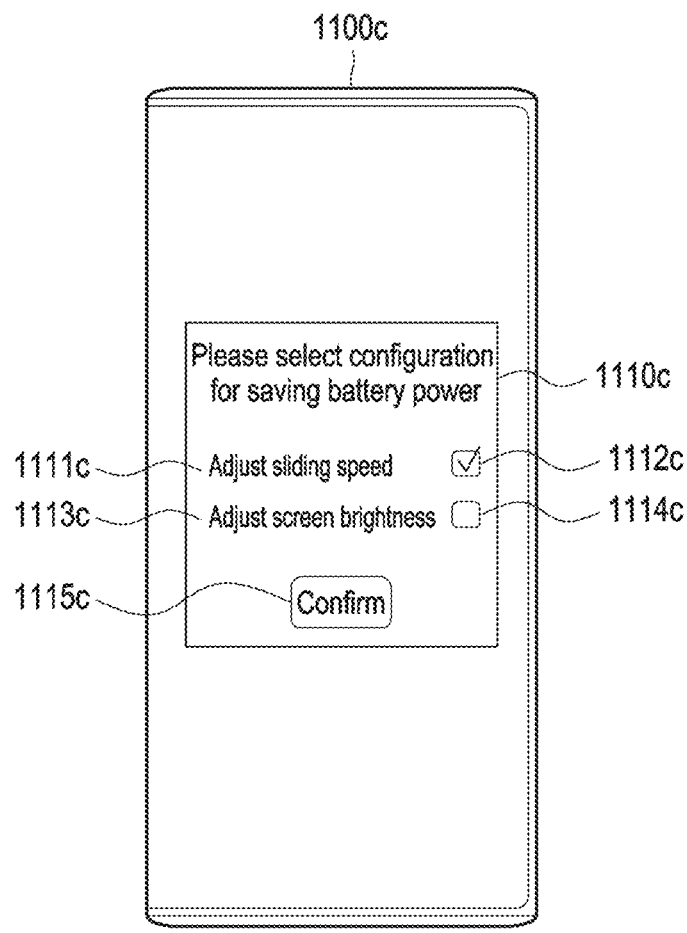

FIG. 11C illustrates an electronic device performing operation 1150a according to an embodiment of the disclosure.

Referring to FIG. 11C, an electronic device 1100c performing operation 1150a may display a pop-up 1110c asking whether or not to adjust a sliding speed and the screen brightness on the display. The pop-up 1110c may include text 1111c indicating adjustment of a sliding speed, text 1113c indicating adjustment of the screen brightness, a checkbox 1112c to identify a user response to the adjustment of a sliding speed, and a checkbox 1114c to identify a user response to the adjustment of the screen brightness. The pop-up 1110c may include a user interface 1115c to confirm the inputs to the checkboxes 1112c and 1114c as final inputs.

In operation 1160a, at least one processor 120 may identify whether or not a predetermined input is identified as a response to the message according to operation 1150a. According to various embodiments, the predetermined input may be an input indicating that the user agrees to at least one of adjusting the display state switch rate and adjusting the screen brightness for saving battery power, which are shown in the message according to operation 1150a.

In the example shown in FIG. 11B, the predetermined input may be an input to the user interface 1111b for identifying a user response corresponding to adjusting the screen brightness.

If a predetermined input is not identified in operation 1160a as in the case where the user interface 912 shown in FIG. 9 is selected, at least one processor 120 may perform operation 1140a. If a predetermined input is identified in operation 1160a as in the case where the user interface 911 shown in FIG. 9 is selected, at least one processor 120 may perform operation 1165a. In operation 1165a, at least one processor 120 may perform at least one of adjusting the display state switch rate or adjusting the screen brightness in response to the predetermined input to the displayed message.

In operation 1170a, at least one processor 120 may identify whether or not the display module 160 is in the first state. Here, the first state may be the extended state. If it is identified that the display is not in the first state in operation 1170a, at least one processor 120 may perform operation 1190a, instead of performing operation 1180a. If it is identified that the display is in the first state in operation 1170a, at least one processor 120 may perform operation 1180a.

In operation 1180a, at least one processor 120 may control the driving circuit 181 to switch the display module 160 to a second state. Here, the second state may be the contracted state.

In operation 1190a, at least one processor 120 may identify whether or not there is an extension command. If an extension command is not identified in operation 1190a, at least one processor 120 may repeat operation 1190a until the extension command is identified.

If an extension command is identified in operation 1190a, at least one processor 120 may display a message notifying that the display module 160 is unable to switch from the second state to the first state on the display module 160 in operation 1195a.

Figure 12:
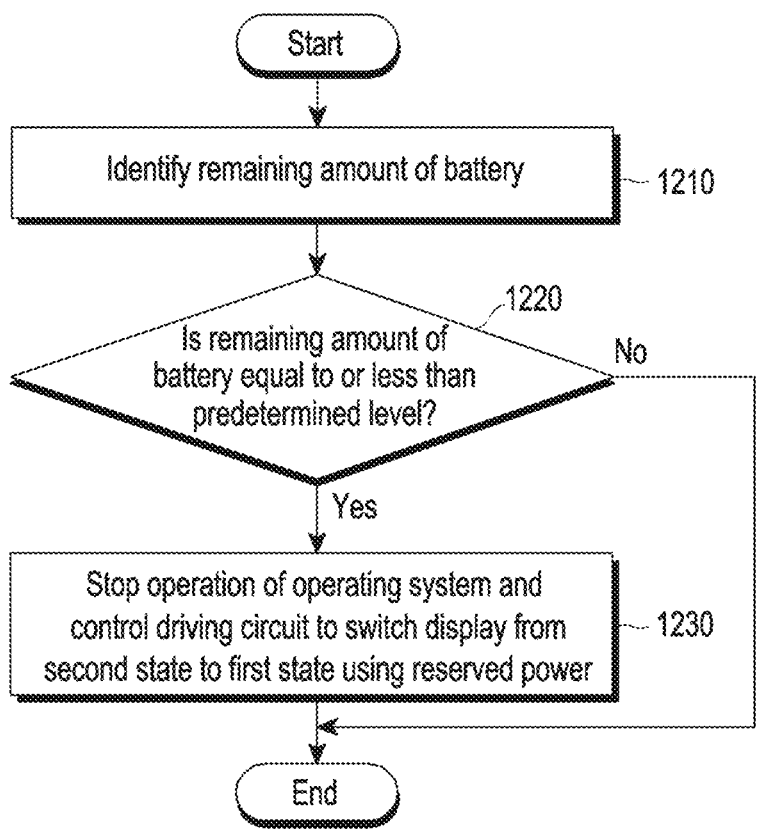
FIG. 12 is a flowchart illustrating an operation performed in an electronic device according to an embodiment of the disclosure.

FIG. 12 is a flowchart illustrating an operation performed in an electronic device according to an embodiment of the disclosure.

Referring to FIG. 12, in operation 1210, at least one processor (e.g., the processor 120) of an electronic device (e.g., the electronic device 101) may identify a remaining amount of battery of the electronic device 101.

In operation 1220, at least one processor 120 may identify whether or not the remaining amount of battery is less than or equal to a predetermined level. According to various embodiments, the predetermined level may be the same as the level allocated as reserved power. The reserved power has been described with reference to FIG. 1. According to various embodiments, if the contraction operation of the display module 160 is performed by the operation of the driving circuit 181 and is unable to be manually performed by the user, the predetermined level may be a level at which the driving circuit 181 is able to perform the contraction operation of the display module 160 once or twice and at which, after the driving circuit 181 performs the contraction operation of the display module 160 once or twice, the battery is completely exhausted so that the operation of the display module 160 and operating system of the electronic device 101 stop. Alternatively, according to various embodiments, in the case where the contraction operation of the display module 160 is able to be manually performed by the user, the predetermined level may be a level at which the battery is completely exhausted so that the operation of the display module 160 and operating system of the electronic device 101 stop.

In operation 1220, if the remaining amount of battery is less than or equal to the predetermined level, at least one processor 120 may stop the operation of the operating system of the electronic device 101 and control the driving circuit 181 to switch the display module 160 from the second state to the first state using reserved power in operation 1230. According to various embodiments, as the operation of the operating system stops, the execution of at least one application running in the electronic device 101 may be terminated, and the application execution screen may not be displayed on the display module 160.

According to various embodiments, in addition to operation 1230, when switching the display module 160 from the extended state to the contracted state, at least one processor 120 may display, on the display module 160, a visual indicator indicating that the state of the display module 160 is to switch due to low battery. According to various embodiments, at least one processor 120 may display, on the display module 160, a visual indicator indicating that the state of the display module 160 has switched due to low battery after performing operation 1230.

According to various embodiments, if the contraction operation of the display module 160 is able to be manually performed by the user, at least one processor 120 may identify the state of the display module 160 in operation 1230 and, if the display module 160 is in the extended state, display a message asking switching of the state of the display module 160 to the contracted state on the display module 160.

According to various embodiments, the operations described with reference to FIG. 12 may be performed in combination with any operation in FIGS. 5A, 6A, 7, 8, 10A, and 11A.

Figure 13:
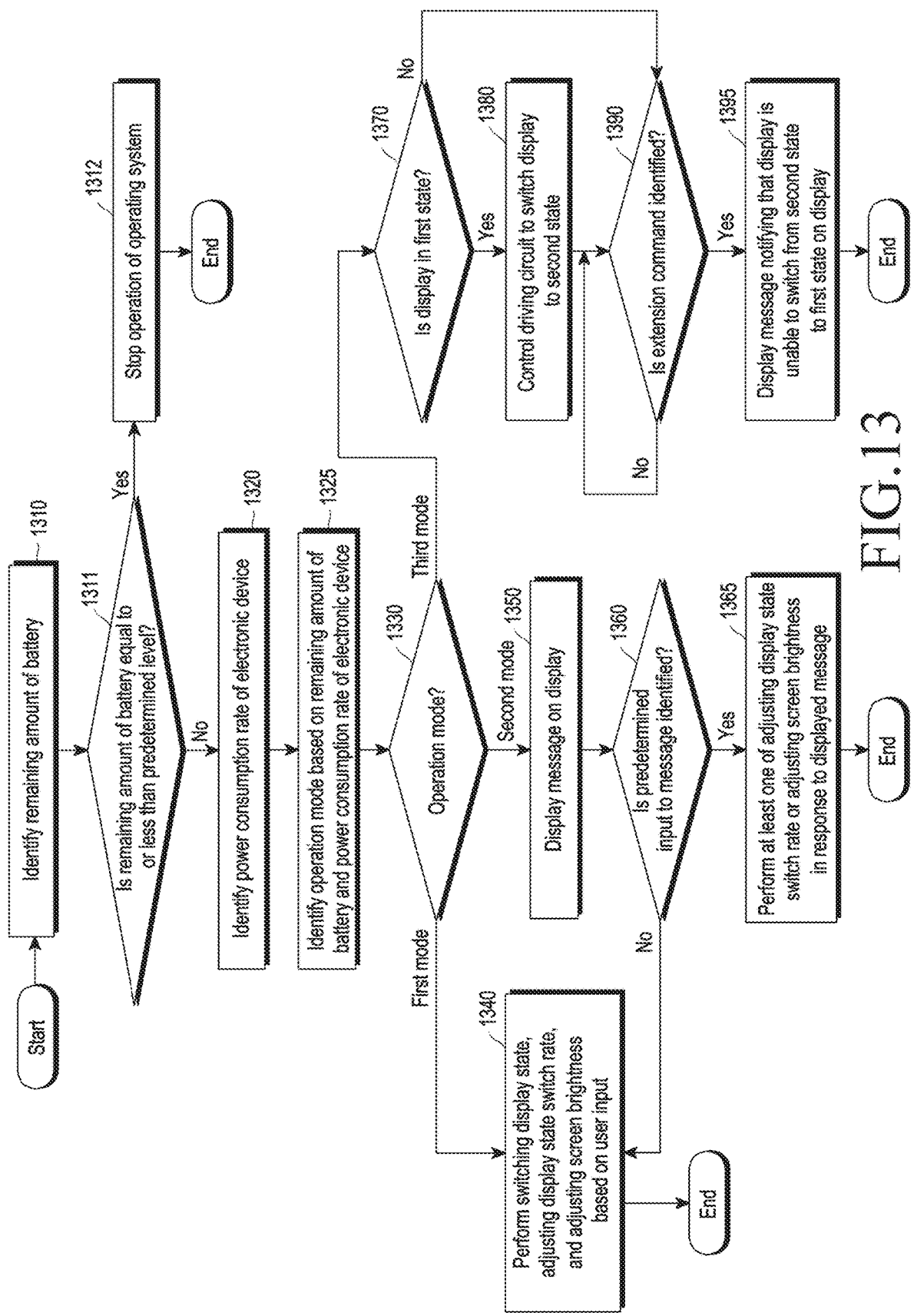
FIG. 13 is a flowchart illustrating an operation performed in an electronic device according to an embodiment of the disclosure.

FIG. 13 is a flowchart illustrating an operation performed in an electronic device according to an embodiment of the disclosure.

Referring to FIG. 13, it describes operations performed by a combination of the operations shown in FIGS. 11A and 12.

In operation 1310, at least one processor (e.g., the processor 120) of an electronic device (e.g., the electronic device 101) may identify a remaining amount of battery of the electronic device 101.

In operation 1311, at least one processor 120 may identify whether or not the remaining amount of battery is less than or equal to a predetermined level. The details of operation 1220 in FIG. 12 may be applied to operation 1311 in the same manner.

If it is identified that the remaining amount of battery is less than or equal to the predetermined level in operation 1311, at least one processor 120 may perform operation 1312. If it is identified that the remaining amount of battery is greater than or equal to the predetermined level in operation 1311, at least one processor 120 may perform operation 1320.

In operation 1312, at least one processor 120 may stop the operation of the operating system of the electronic device 101. The details of operation 1230 in FIG. 12 may be applied to operation 1312 in the same manner.

In operation 1320, at least one processor 120 may identify a power consumption rate of the electronic device 101. The details of operation 510a in FIG. 5A may be applied to operation 1320 in the same manner.

In operation 1325, at least one processor 120 may identify an operation mode, based on the remaining amount of battery and the power consumption rate of the electronic device 101. The details of operation 1120a in FIG. 11A may be applied to operation 1325 in the same manner.

In operation 1330, at least one processor 120 may operate in the operation mode identified in operation 1325. If the operation mode identified in operation 1330 is a first mode, at least one processor 120 may perform operation 1340. If the operation mode identified in operation 1330 is a second mode, at least one processor 120 may perform operation 1350. If the operation mode identified in operation 1330 is a third mode, at least one processor 120 may perform operation 1370.

In operation 1340, at least one processor 120 may perform at least one of switching the display state, adjusting a display state switch rate, and adjusting screen brightness, based on a user input. The details of operation 1140a in FIG. 11A may be applied to operation 1340 in the same manner.

In operation 1350, at least one processor 120 may display a message on the display module 160. The details of operation 1150a in FIG. 11A may be applied to operation 1350 in the same manner.

In operation 1360, at least one processor 120 may identify whether or not a predetermined input is identified as a response to the message according to operation 1350. The details of operation 1160a in FIG. 11A may be applied to operation 1360 in the same manner.

If a predetermined input is not identified in operation 1360, at least one processor 120 may perform operation 1340.

If a predetermined input is identified in operation 1360, at least one processor 120 may perform operation 1365. In operation 1365, at least one processor 120 may perform at least one of adjusting the display state switch rate or adjusting the screen brightness in response to the displayed message.

In operation 1370, at least one processor 120 may identify whether or not the display module 160 is in a first state. Here, the first state may be the extended state. If it is identified that the display is not in the first state in operation 1370, at least one processor 120 may perform operation 1390, instead of operation 1380. If it is identified that the display is in the first state in operation 1370, at least one processor 120 may perform operation 1380.

In operation 1380, at least one processor 120 may control the driving circuit 181 to switch the display module 160 to a second state. Here, the second state may be the contracted state.

In operation 1390, at least one processor 120 may identify whether or not there is an extension command. If an extension command is not identified in operation 1390, at least one processor 120 may repeat operation 1390 until the extension command is identified.

If an extension command is identified in operation 1390, at least one processor 120 may display a message notifying that the display module 160 is unable to switch from the second state to the first state on the display module 160 in operation 1395.

Figure 14A:
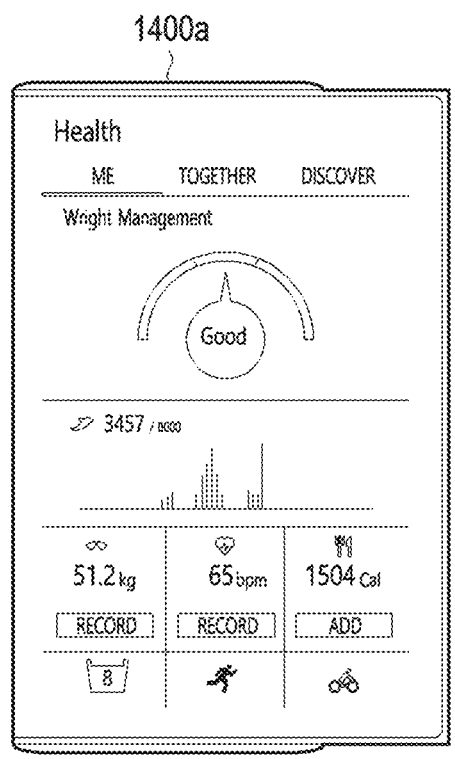
FIGS. 14A, 14B, and 14C illustrate screens displayed on a display of an electronic device according to various embodiments of the disclosure.
Figure 14B:
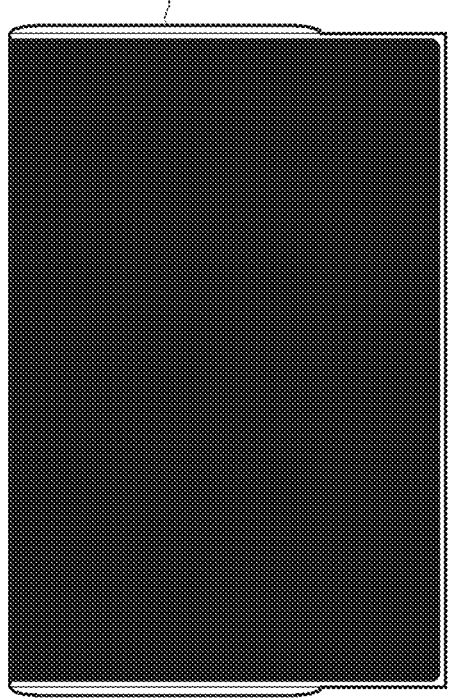
Figure 14C:
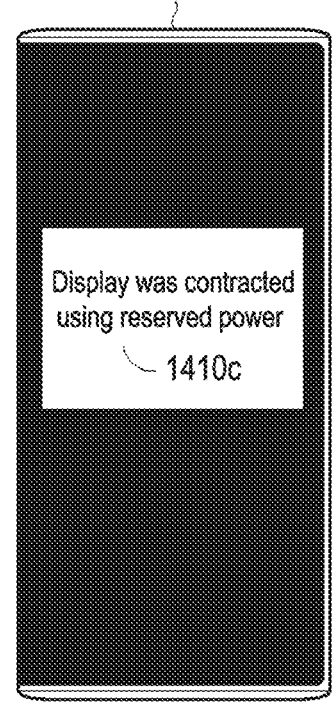

FIGS. 14A, 14B, and 14C illustrate screens displayed on a display of an electronic device according to various embodiments of the disclosure.

Referring to FIGS. 14A, 14B, and 14C, the remaining amount of battery of an electronic device 1400a in FIG. 14A may exceed the predetermined level described in relation to operation 1220 in FIG. 12 or operation 1311 in FIG. 13. In the electronic device 1400a in FIG. 14A, the operating system may normally operate, and an execution screen of at least one application may be displayed on a display.

According to various embodiments, when the remaining amount of battery of the electronic device 1400a in FIG. 14A becomes less than the predetermined level described in relation to operation 1220 in FIG. 12 or operation 1311 in FIG. 13 as it continues to consume power, the electronic device 1400a may operate as shown in FIG. 14B. The remaining amount of battery of an electronic device 1400b in FIG. 14B may be less than the predetermined level described in relation to operation 1220 in FIG. 12 or operation 1311 in FIG. 13. In the electronic device 1400b in FIG. 14B, the operation of the operating system may be stopped, and a black screen, instead of the execution screen of the application, may be displayed on a display.

According to various embodiments, when the remaining amount of battery of the electronic device 1400a in FIG. 14A becomes less than the predetermined level described in relation to operation 1220 in FIG. 12 or operation 1311 in FIG. 13 as it continues to consume power, the electronic device 1400a may switch from the state shown in FIG. 14B to the state shown in FIG. 14C. The electronic device 1400c in FIG. 14C may be the electronic device 1400c after performing operation 1230 in FIG. 12 or operation 1312 in FIG. 13. Referring to FIG. 14C, the display of the electronic device 1400c may switch from the second state to the first state using reserved power. At least one processor of the electronic device 1400c may display, on the display, a visual indicator 1410c indicating that the display has been contracted using reserved power.

An electronic device according to various embodiments may include a display, a driving circuit, a battery, and at least one processor, wherein the at least one processor may be configured to identify a remaining amount of the battery and a power consumption rate of the electronic device and control the driving circuit to switch the display from a first state to a second state, based on the remaining amount of battery and the power consumption rate, wherein a first area of the display is exposed in the first state, the first area including a second area and a third area and wherein the second area is exposed and the third area is not exposed in the second state.

According to various embodiments, the at least one processor may be configured to identify the power consumption rate of the electronic device, based on at least one application running in a foreground.

According to various embodiments, the at least one processor may be configured to control the driving circuit to switch the display from the first state to the second state, based on identifying that the remaining amount of battery is less than a first level.

According to various embodiments, the at least one processor may be configured to control the driving circuit to switch the display from the first state to the second state in response to identifying that the remaining amount of battery is less than the first level and that the power consumption rate is greater than or equal to a first rate.

According to various embodiments, the at least one processor may be further configured to identify a switch command for switching the display from the second state to the first state or switching the display from the first state to the second state and control the driving circuit to reduce at least one of a rate of switching the display from the second state to the first state or a rate of switching the display from the first state to the second state, based on the remaining amount of battery and the power consumption rate, in response to the switch command.

According to various embodiments, the at least one processor may be further configured to control the driving circuit to reduce at least one of a rate of switching the display from the second state to the first state or a rate of switching the display from the first state to the second state, based on identifying that the remaining amount of battery is greater than or equal to a first level and less than a second level and that the power consumption rate is greater than or equal to a first rate, in response to the switch command.

According to various embodiments, the at least one processor may be configured to display, on the display, a message indicating that at least one of a rate of switching the display from the second state to the first state or a rate of switching the display from the first state to the second state is to be reduced in response to identifying that the remaining amount of battery is greater than or equal to a first level and less than a second level and that the power consumption rate is greater than or equal to a first rate and, based on an input to the message, control the driving circuit to reduce at least one of the rate of switching the display from the second state to the first state or the rate of switching the display from the first state to the second state in response to the switch command.

According to various embodiments, the at least one processor may be further configured to control the driving circuit to reduce at least one of a rate of switching the display from the second state to the first state or a rate of switching the display from the first state to the second state, based on identifying that the remaining amount of battery is less than the first level and that the power consumption rate is less than the first rate, in response to the switch command.

According to various embodiments, the at least one processor may be configured to display, on the display, a message indicating that at least one of a rate of switching the display from the second state to the first state or a rate of switching the display from the first state to the second state is to be reduced in response to identifying that the remaining amount of battery is less than the first level and that the power consumption rate is less than the first rate and, based on an input to the message, control the driving circuit to reduce at least one of the rate of switching the display from the second state to the first state or the rate of switching the display from the first state to the second state in response to the switch command.

According to various embodiments, the at least one processor may be further configured to identify an extension command to switch the display from the second state to the first state after controlling the driving circuit to switch the display from the first state to the second state, based on the remaining amount of battery and the power consumption rate, and, in response to the extension command, display a message indicating that the display is unable to switch from the second state to the first state on the display.

An electronic device according to various embodiments may include a display, a driving circuit, a battery, and at least one processor, wherein the at least one processor may be configured to identify a remaining amount of the battery and a power consumption rate of the electronic device, identify an extension command to switch the display from a second state to a first state, control the driving circuit to switch the display from the second state to the first state, based on the remaining amount of battery and the power consumption rate, in response to the extension command, and control the display such that the screen brightness in the first state is less than the screen brightness in the second state, wherein a first area of the display is exposed in the first state, the first area including a second area and a third area and wherein the second area is exposed and the third area is not exposed in the second state.

According to various embodiments, a method performed by at least one processor of an electronic device may include identifying a remaining amount of battery of the electronic device and a power consumption rate of the electronic device and controlling the driving circuit to switch a display of the electronic device from a first state to a second state, based on the remaining amount of battery and the power consumption rate, wherein a first area of the display may be exposed in the first state, the first area including a second area and a third area and wherein the second area may be exposed and the third area may not be exposed in the second state.

According to various embodiments, the identifying of the power consumption rate of the electronic device may include identifying the power consumption rate, based on at least one application running in a foreground.

According to various embodiments, the controlling the driving circuit of the electronic device to switch the display of the electronic device from the first state to the second state, based on the remaining amount of battery and the power consumption rate, may include controlling the driving circuit to switch the display from the first state to the second state, based on identifying that the remaining amount of battery is less than a first level.

According to various embodiments, the controlling the driving circuit to switch the display from the first state to the second state, based on identifying that the remaining amount of battery is less than a first level, may include controlling the driving circuit to switch the display from the first state to the second state in response to identifying that the remaining amount of battery is less than the first level and that the power consumption rate is greater than or equal to a first rate.

According to various embodiments, the method may further include identifying a switch command for switching the display from the second state to the first state or switching the display from the first state to the second state and controlling the driving circuit to reduce at least one of a rate of switching the display from the second state to the first state or a rate of switching the display from the first state to the second state, based on the remaining amount of battery and the power consumption rate, in response to the switch command.

According to various embodiments, the controlling the driving circuit to reduce at least one of the rate of switching the display from the second state to the first state or the rate of switching the display from the first state to the second state, based on the remaining amount of battery and the power consumption rate, in response to the switch command may include controlling the driving circuit to reduce at least one of a rate of switching the display from the second state to the first state or a rate of switching the display from the first state to the second state, based on identifying that the remaining amount of battery is greater than or equal to a first level and less than a second level and that the power consumption rate is greater than or equal to a first rate, in response to the switch command.

According to various embodiments, the controlling the driving circuit to reduce at least one of the rate of switching the display from the second state to the first state or the rate of switching the display from the first state to the second state, based on identifying that the remaining amount of battery is greater than or equal to a first level and less than a second level and that the power consumption rate is greater than or equal to a first rate, in response to the switch command may include displaying, on the display, a message indicating that at least one of the rate of switching the display from the second state to the first state or the rate of switching the display from the first state to the second state is to be reduced in response to identifying that the remaining amount of battery is greater than or equal to a first level and less than a second level and that the power consumption rate is greater than or equal to a first rate and, based on an input to the message, controlling the driving circuit to reduce at least one of the rate of switching the display from the second state to the first state or the rate of switching the display from the first state to the second state in response to the switch command.

According to various embodiments, the controlling the driving circuit to reduce at least one of the rate of switching the display from the second state to the first state or the rate of switching the display from the first state to the second state, based on the remaining amount of battery and the power consumption rate, in response to the switch command may include controlling the driving circuit to reduce at least one of the rate of switching the display from the second state to the first state or the rate of switching the display from the first state to the second state, based on identifying that the remaining amount of battery is less than the first level and that the power consumption rate is less than the first rate, in response to the switch command.

According to various embodiments, the controlling the driving circuit to reduce at least one of the rate of switching the display from the second state to the first state or the rate of switching the display from the first state to the second state, based on identifying that the remaining amount of battery is less than the first level and that the power consumption rate is less than the first rate, in response to the switch command may include displaying, on the display, a message indicating that at least one of the rate of switching the display from the second state to the first state or the rate of switching the display from the first state to the second state is to be reduced in response to identifying that the remaining amount of battery is less than the first level and that the power consumption rate is less than the first rate and, based on an input to the message, controlling the driving circuit to reduce at least one of the rate of switching the display from the second state to the first state or the rate of switching the display from the first state to the second state in response to the switch command.

According to various embodiments, a storage medium that stores commands, the commands being configured to enable at least one processor of an electronic device to perform at least one operation when executed by the at least one processor may be provided. The at least one operation may include identifying a remaining amount of a battery of the electronic device and a power consumption rate of the electronic device, and controlling a driving circuit of the electronic device to switch a display of the electronic device from a first state to a second state, based on the remaining amount of battery and the power consumption rate, wherein a first area of the display is exposed in the first state, the first area including a second area and a third area and wherein the second area is exposed and the third area is not exposed in the second state.

According to various embodiments, the identifying of the power consumption rate of the electronic device comprises identifying the power consumption rate of the electronic device, based on at least one application running in a foreground.

According to various embodiments, the controlling of the driving circuit of the electronic device to switch the display of the electronic device from the first state to the second state, based on the remaining amount of battery and the power consumption rate, comprises controlling the driving circuit to switch the display from the first state to the second state, based on identifying that the remaining amount of battery is less than a first level.

According to various embodiments, the controlling of the driving circuit to switch the display from the first state to the second state, based on identifying that the remaining amount of battery is less than the first level, comprises controlling the driving circuit to switch the display from the first state to the second state in response to identifying that the remaining amount of battery is less than the first level and that the power consumption rate is greater than or equal to a first rate.

According to various embodiments, the at least one operation may further include identifying a switch command for switching the display from the second state to the first state or switching the display from the first state to the second state, and controlling the driving circuit to reduce at least one of a rate of switching the display from the second state to the first state or a rate of switching the display from the first state to the second state, based on the remaining amount of battery and the power consumption rate, in response to the switch command.

According to various embodiments, the controlling of the driving circuit to reduce at least one of the rate of switching the display from the second state to the first state or the rate of switching the display from the first state to the second state, based on the remaining amount of battery and the power consumption rate, in response to the switch command, comprises controlling the driving circuit to reduce at least one of a rate of switching the display from the second state to the first state or a rate of switching the display from the first state to the second state, based on identifying that the remaining amount of battery is greater than or equal to a first level and less than a second level and that the power consumption rate is greater than or equal to a first rate, in response to the switch command.

According to various embodiments, the at least one operation may further include displaying, on the display, a message indicating that at least one of a rate of switching the display from the second state to the first state or a rate of switching the display from the first state to the second state is to be reduced in response to identifying that the remaining amount of battery is greater than or equal to a first level and less than a second level and that the power consumption rate is greater than or equal to a first rate, and based on an input to the message, controlling the driving circuit to reduce at least one of the rate of switching the display from the second state to the first state or the rate of switching the display from the first state to the second state in response to the switch command.

According to various embodiments, the controlling of the driving circuit to reduce at least one of the rate of switching the display from the second state to the first state or the rate of switching the display from the first state to the second state, based on the remaining amount of battery and the power consumption rate, in response to the switch command, comprises controlling the driving circuit to reduce at least one of a rate of switching the display from the second state to the first state or a rate of switching the display from the first state to the second state, based on identifying that the remaining amount of battery is less than the first level and that the power consumption rate is less than the first rate, in response to the switch command.

According to various embodiments, the at least one operation may further include displaying, on the display, a message indicating that at least one of a rate of switching the display from the second state to the first state or a rate of switching the display from the first state to the second state is to be reduced in response to identifying that the remaining amount of battery is less than the first level and that the power consumption rate is less than the first rate, and based on an input to the message, controlling the driving circuit to reduce at least one of the rate of switching the display from the second state to the first state or the rate of switching the display from the first state to the second state in response to the switch command.

According to various embodiments, the at least one operation may further include identifying an extension command to switch the display from the second state to the first state after controlling the driving circuit to switch the display from the first state to the second state based on the remaining amount of battery and the power consumption rate, and in response to the extension command, displaying a message indicating that the display is unable to switch from the second state to the first state on the display.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first housing part and a second housing part configured to movably engage with the first housing part between a closed state and an opened state;
   a flexible display coupled to the first housing part and the second housing part such that a size of an area of the flexible display that is visible from a front side of the housing changes as the second housing part is moved between the closed state and the opened state;
   a battery;
   a driving circuit;
   at least one processor; and
   memory storing instructions that, when executed by the at least one processor, cause the electronic device to:
      identify a remaining amount of the battery and a power consumption rate of the electronic device, and
      control the driving circuit to switch the housing from the opened state to the closed state to change the size of the area of the display that is visible from the front side of the housing, based on the remaining amount of battery and the power consumption rate,
   wherein a first area of the display is exposed in the opened state, the first area including a second area and a third area, and
   wherein the second area is exposed and the third area is not exposed in the closed state.

2. The electronic device of claim 1, wherein the instructions, when executed by the at least one processor, cause the electronic device to:
   identify the power consumption rate of the electronic device, based on at least one application running in a foreground.

3. The electronic device of claim 1, wherein the instructions, when executed by the at least one processor, cause the electronic device to:
   control the driving circuit to switch the housing from the opened state to the closed state, based on identifying that the remaining amount of battery is less than a first level.

4. The electronic device of claim 3, wherein the instructions, when executed by the at least one processor, cause the electronic device to:
   control the driving circuit to switch the housing from the opened state to the closed state based on identifying that the remaining amount of battery is less than the first level and that the power consumption rate is greater than or equal to a first rate.

5. The electronic device of claim 1, wherein the instructions, when executed by the at least one processor, cause the electronic device to:
   identify a switch command for switching the housing from the closed state to the opened state or switching the housing from the opened state to the closed state; and
   control the driving circuit to reduce at least one of a rate of switching the housing from the closed state to the opened state or a rate of switching the housing from the opened state to the closed state, based on the remaining amount of battery and the power consumption rate, in response to the switch command.

6. The electronic device of claim 5, wherein the instructions, when executed by the at least one processor, cause the electronic device to:
   control the driving circuit to reduce at least one of a rate of switching the housing from the closed state to the opened state or a rate of switching the housing from the opened state to the closed state, based on identifying that the remaining amount of battery is greater than or equal to a first level and less than a second level and that the power consumption rate is greater than or equal to a first rate, in response to the switch command.

7. The electronic device of claim 6, wherein the instructions, when executed by the at least one processor, cause the electronic device to:
   display, on the display, a message indicating that at least one of a rate of switching the housing from the closed state to the opened state or a rate of switching the housing from the opened state to the closed state is to be reduced in response to identifying that the remaining amount of battery is greater than or equal to a first level and less than a second level and that the power consumption rate is greater than or equal to a first rate, and
   based on an input to the message, control the driving circuit to reduce at least one of the rate of switching the housing from the closed state to the opened state or the rate of switching the housing from the opened state to the closed state in response to the switch command.

8. The electronic device of claim 6, wherein the instructions, when executed by the at least one processor, cause the electronic device to:
control the driving circuit to reduce at least one of a rate of switching the housing from the closed state to the opened state or a rate of switching the housing from the opened state to the closed state, based on identifying that the remaining amount of battery is less than the first level and that the power consumption rate is less than the first rate, in response to the switch command.

9. The electronic device of claim 8, wherein the instructions, when executed by the at least one processor, cause the electronic device to:
display, on the display, a message indicating that at least one of a rate of switching the housing from the closed state to the opened state or a rate of switching the housing from the opened state to the closed state is to be reduced in response to identifying that the remaining amount of battery is less than the first level and that the power consumption rate is less than the first rate; and
based on an input to the message, control the driving circuit to reduce at least one of the rate of switching the housing from the closed state to the opened state or the rate of switching the housing from the opened state to the closed state in response to the switch command.

10. The electronic device of claim 1, wherein the instructions, when executed by the at least one processor, cause the electronic device to:
identify an extension command to switch the housing from the closed state to the opened state after controlling the driving circuit to switch the housing from the opened state to the closed state based on the remaining amount of battery and the power consumption rate; and
based on the extension command, display, on the display, a message indicating that the display is unable to switch from the closed state to the opened state.

11. A method comprising:
identifying a remaining amount of a battery of an electronic device and a power consumption rate of the electronic device; and
controlling a driving circuit of the electronic device to switch a housing of the electronic device from an opened state to a closed state to change a size of an area of a display of the electronic device that is visible from a front side of the housing, based on the remaining amount of the battery and the power consumption rate,
wherein a first area of the display of the electronic device is exposed in the opened state, the first area including a second area and a third area, and
wherein the second area is exposed and the third area is not exposed in the closed state.

12. The method of claim 11, wherein the identifying of the power consumption rate of the electronic device comprises identifying the power consumption rate, based on at least one application running in a foreground.

13. The method of claim 11, wherein the controlling of the driving circuit of the electronic device to switch the housing from the opened state to the closed state, based on the remaining amount of the battery and the power consumption rate, comprises controlling the driving circuit to switch the housing from the opened state to the closed state, based on identifying that the remaining amount of the battery is less than a first level.

14. The method of claim 13, wherein the controlling of the driving circuit to switch the housing from the opened state to the closed state, based on identifying that the remaining amount of the battery is less than the first level, comprises controlling the driving circuit to switch the housing from the opened state to the closed state based on identifying that the remaining amount of the battery is less than the first level and that the power consumption rate is greater than or equal to a first rate.

15. The method of claim 11, further comprising:
identifying a switch command for switching the housing from the closed state to the opened state or switching the housing from the opened state to the closed state; and
controlling the driving circuit to reduce at least one of a rate of switching the housing from the closed state to the opened state or a rate of switching the housing from the opened state to the closed state, based on the remaining amount of the battery and the power consumption rate, in response to the switch command.

* * * * *